United States Patent
Wang et al.

(10) Patent No.: US 9,882,810 B2
(45) Date of Patent: Jan. 30, 2018

(54) METHOD AND DEVICE FOR DATA TRANSFER OVER A PLURALITY OF LINKS

(71) Applicant: Leauto Intelligent Technology (BEIJING) Co. Ltd., Beijing (CN)

(72) Inventors: Lei Wang, Beijing (CN); Zhaofeng Du, Beijing (CN)

(73) Assignee: LEAUTO INTELLIGENT TECHNOLOGY (BEIJING) CO. LTD., Beijing (CN)

( * ) Notice: Subject to any disclaimer, the term of this patent is extended or adjusted under 35 U.S.C. 154(b) by 106 days.

(21) Appl. No.: 14/970,442

(22) Filed: Dec. 15, 2015

(65) Prior Publication Data
US 2017/0134273 A1    May 11, 2017

(30) Foreign Application Priority Data
Nov. 11, 2015    (CN) .......................... 2015 1 0766261

(51) Int. Cl.
H04L 12/28    (2006.01)
H04L 12/741    (2013.01)
H04L 12/713    (2013.01)

(52) U.S. Cl.
CPC ............ *H04L 45/74* (2013.01); *H04L 45/586* (2013.01)

(58) Field of Classification Search
USPC .......... 370/216–252, 331–395; 709/221–245
See application file for complete search history.

(56) References Cited

U.S. PATENT DOCUMENTS

| 7,457,626 | B2 * | 11/2008 | Bahl ................... H04L 12/4633 370/328 |
| 7,512,784 | B2 * | 3/2009 | Skerner .............. H04L 12/2856 709/218 |
| 7,580,417 | B2 * | 8/2009 | Ervin .................... H04L 47/125 370/397 |

(Continued)

FOREIGN PATENT DOCUMENTS

| CN | 101072161 A | 11/2007 |
| CN | 102098201 | 6/2011 |

(Continued)

OTHER PUBLICATIONS

Zhang, Yunhe et al, "Session-based Tunnel Scheduling Model in Multi-link Aggregate IPsec VPN," 2009 Third International Conference on Multimedia and Ubiquitous Engineering. MUE '09. Third International Conference on Jul. 6, 2009 (Jul. 6, 2009), pp. 505-510; Abstract only.

(Continued)

*Primary Examiner* — Man Phan

(57) ABSTRACT

The disclosure discloses a method and device for data transfer over a plurality of links, the method including: selecting, by a transmitting device, a virtual link over which a data packet needs to be transmitted, from a plurality of virtual links; determining, by the transmitting device, a physical link corresponding to the selected virtual link according to a binding relationship between the virtual link and the physical link; and transmitting, by the transmitting device, the data packet to a receiving device over the determined physical link; wherein the data packet includes an Internet Protocol (IP) address corresponding to the virtual link, and the plurality of virtual links correspond to the same IP address.

13 Claims, 21 Drawing Sheets

(56) References Cited

U.S. PATENT DOCUMENTS

| | | | |
|---|---|---|---|
| 7,660,324 B2* | 2/2010 | Oguchi | H04L 12/4641 370/229 |
| 9,350,712 B2* | 5/2016 | Han | H04L 63/0272 |
| 9,444,723 B1* | 9/2016 | Di Benedetto | H04L 45/14 |
| 2006/0206934 A1* | 9/2006 | Ammirata | H04L 61/2015 726/15 |
| 2009/0168781 A1 | 7/2009 | Fung et al. | |
| 2012/0084411 A1* | 4/2012 | Sood | H04L 29/12481 709/220 |
| 2013/0018765 A1* | 1/2013 | Fork | H04L 67/10 705/34 |
| 2016/0366184 A1* | 12/2016 | Luo | H04L 63/02 |

FOREIGN PATENT DOCUMENTS

| | | |
|---|---|---|
| CN | 102404221 | 4/2012 |
| CN | 102801695 A | 11/2012 |
| CN | 105656747 A | 6/2016 |

OTHER PUBLICATIONS

International Search Report dated Aug. 1, 2016 for International Application No. PCT/CN2016/082150 (5 pages).

* cited by examiner

METHOD AND DEVICE FOR DATA TRANSFER OVER A PLURALITY OF LINKS

CROSS-REFERENCE TO RELATED APPLICATIONS

This application claims priority to Chinese patent application No. 201510766261.9 filed on Nov. 11, 2015 and titled "METHOD AND DEVICE FOR DATA TRANSFER OVER A PLURALITY OF LINKS", the content of which is incorporated herein by reference in its entirety.

FIELD OF TECHNOLOGY

The present disclosure relates to the field of communications and particularly to a method and device for data transfer over a plurality of links.

BACKGROUND

There has been a constantly growing bandwidth demand of users along with the development of network technologies, and an increasing number of video and other applications. Existing network devices can only access the Internet via single network interface at a time, so the network bandwidth may be limited by network deployment by a serving operator and the current number of users in this scenario. Although the network devices of the users are provided with a plurality of network interfaces via which they can access different types of networks, including wired networks, wireless networks, cellular data networks, etc., data on a virtual card can only be transferred on a default network device, so the users can not access the Internet over these networks concurrently.

The technology of layer 2 Tunneling Protocol (L2TP) is a widely applied Virtual Private Network (VPN) technology in which a device with a plurality of network interfaces can set up a tunnel with an L2TP server through an L2TP client so that the device can access the Internet over a proxy VPN of the server. In the prior art, the L2TP enabled device with a plurality of network interfaces sets up virtual links over a plurality of physical links over which data are transmitted, and generates respective virtual network cards for the virtual links corresponding to the respective network interfaces, where data on the virtual network card are transmitted over the physical link corresponding to the interface of a default route thereof. In the prior art, although the device is provided with a plurality of network interfaces, there is only one default route, so that the data can not be transmitted concurrently over the plurality of physical links corresponding to the plurality of network interfaces, thus resulting in a waste of the resources in the network with a plurality of links.

Thus in the prior art, the device with a plurality of network interfaces can only transmit the data over the physical link corresponding to the single network interface in the default route, so that the data can not be transmitted concurrently over the plurality of physical links corresponding to the device with a plurality of network interfaces, thus resulting in a waste of the resources in the network with a plurality of links.

SUMMARY

An embodiment of the disclosure provides a method for data transfer over a plurality of links, the method including:

selecting, by a transmitting device, a virtual link over which a data packet needs to be transmitted, from a plurality of virtual links;

determining, by the transmitting device, a physical link corresponding to the selected virtual link according to a binding relationship between the virtual link and the physical link; and transmitting, by the transmitting device, the data packet to a receiving device over the determined physical link;

wherein the data packet includes an Internet Protocol (IP) address corresponding to the virtual link, and the plurality of virtual links correspond to the same IP address.

An embodiment of the disclosure provides another device for data transfer over a plurality of links, the device including:

one or more processors; and a memory;

wherein the memory has computer readable program codes stored therein, and the one or more processors are configured to execute the computer readable program codes to perform:

selecting at least one virtual link over which a data packet needs to be transmitted, from a plurality of virtual links;

determining a physical link corresponding to the selected virtual link according to a binding relationship between the virtual link and the physical link; and transmitting the data packet to a receiving device over the determined physical link;

wherein the data packet includes an Internet Protocol (IP) address corresponding to the virtual link, and the plurality of virtual links correspond to the same IP address.

BRIEF DESCRIPTION OF THE DRAWINGS

In order to make the technical solutions in the embodiments of the disclosure more apparent, the drawings to which the embodiments are described with reference will be briefly introduced below, and apparently the drawings to be described below are merely illustrative of some of the embodiments of the disclosure, and those ordinarily skilled in the art can derive from these drawings other drawings without any inventive effort. In the drawings.

DETAILED DESCRIPTION OF THE EMBODIMENTS

Figure 1:
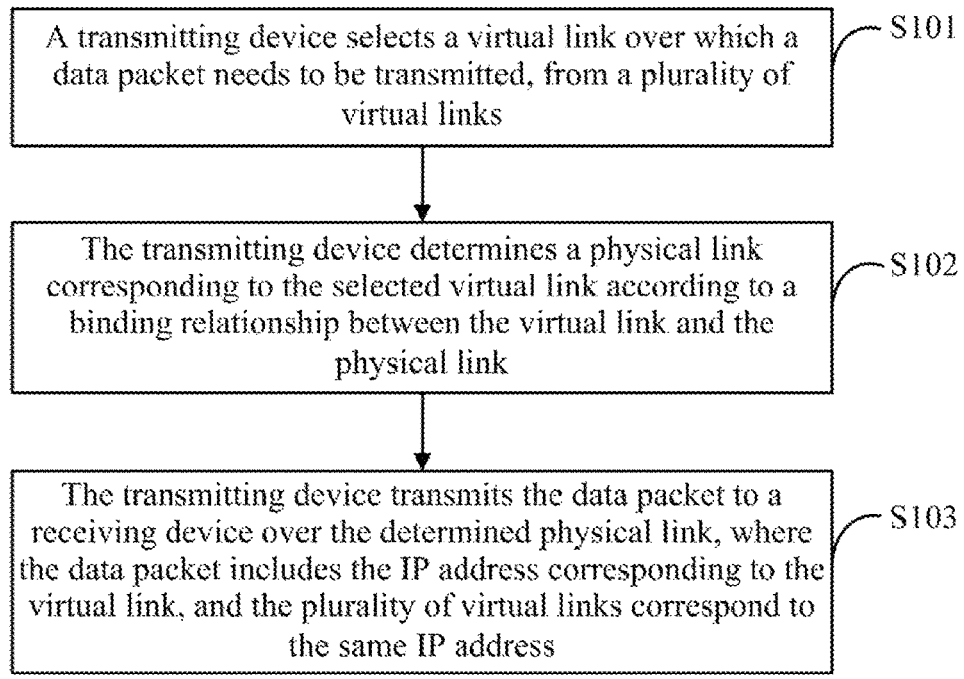
FIG. 1 is a schematic diagram of a first method for data transfer over a plurality of links according to an embodiment of the disclosure.

In order to make the objects, the technical solutions and the advantages of the embodiments of the disclosure more apparent, the technical solutions in the embodiments of the disclosure will be further described in details with reference to the drawings in the embodiments of the disclosure. Apparently the described embodiments are only a part but all of the embodiments of the disclosure. Based upon the embodiments here of the disclosure, all of other embodiments derived by those ordinarily skilled in the art without any inventive effort shall come into the scope of the disclosure.

The disclosure provides a method and device for data transfer over a plurality of links so as to address such a problem in the prior art that the device with a plurality of network interfaces can only transmit the data over the physical link corresponding to the single network interface in the default route, so that the data can not be transmitted concurrently over the plurality of physical links corresponding to the device with a plurality of network interfaces, thus resulting in a waste of the resources in the network with a plurality of links.

In order to attain the object above, an embodiment of the disclosure provides a method for data transfer over a plurality of links, the method including:

selecting, by a transmitting device, a virtual link over which a data packet needs to be transmitted, from a plurality of virtual links;

determining, by the transmitting device, a physical link corresponding to the selected virtual link according to a binding relationship between the virtual link and the physical link; and transmitting, by the transmitting device, the data packet to a receiving device over the determined physical link;

wherein the data packet includes an Internet Protocol (IP) address corresponding to the virtual link, and the plurality of virtual links correspond to the same IP address.

In the embodiment above of the disclosure, the transmitting device selects the virtual link over which a data packet needs to be transmitted, from the plurality of virtual links; the transmitting device determines the physical link corresponding to the selected virtual link according to the binding relationship between the virtual link and the physical link; and the transmitting device transmits the data packet to the receiving device over the determined physical link, where the data packet includes an IP address corresponding to the virtual link, and the plurality of virtual links correspond to the same IP address. The transmitting device selects the virtual link over which a data packet needs to be transmitted, from the plurality of virtual links, and determines the physical link corresponding to the selected virtual link according to the binding relationship between the virtual link and the physical link, so that the stability of transmitting the data can be guaranteed by the virtual links corresponding to the physical links, via a plurality of network interfaces in a default route of the transmitting device, and the data can be transmitted over a plurality of links, that is, over the determined physical links corresponding to the virtual links, thus making use of the resources in the network with a plurality of links effectively and improving the rate at which the data are transmitted.

Optionally the binding relationship between the virtual link and the physical link is a binding relationship between the identifier of the virtual link, and the IP address of the physical link.

In the embodiment above of the disclosure, the binding relationship between the virtual link and the physical link is determined using the identifier of the virtual link, and the IP address of the physical link, so that after the transmitting device selects the virtual link over which the data packet is transmitted, the transmitting device can guarantee the stability of transmitting the data packet over the virtual link, and transmit the data packet over the determined physical link corresponding to the selected virtual link over which the data packet is transmitted, so the transmitting device can transmit the data over a plurality of links, thus making use of the resources in the network with a plurality of links effectively and improving the rate at which the data are transmitted.

Optionally before the transmitting device selects the virtual link over which a data needs to be transmitted, from the plurality of virtual links, the method further includes:

determining, by the transmitting device, an IP address which is notified to the receiving device during handshake authentication, and setting up a virtual link for a physical link corresponding to the determined IP address, after handshake authentication between the transmitting device and the receiving device is successful; and updating, by the transmitting device, a binding relationship between the virtual link and the physical link, and transmitting the updated binding relationship between the virtual link and the physical link to the receiving device.

In the embodiment above of the disclosure, before the transmitting device selects the virtual link over a data needs to be transmitted, from the plurality of virtual links, the transmitting device performs handshake authentication with the receiving device, and after handshake authentication is successful, the transmitting device determines the IP address which is notified to the receiving device during handshake authentication, sets up the virtual link for the physical link corresponding to the determined IP address, and updates and transmits the binding relationship between the virtual link and the physical link to the receiving device. The stability of transmitting the data packet can be guaranteed using the virtual links set up at the transmitting device, corresponding to the physical links, and the network bandwidth for transmitting the data packet is the sum of the respective link bandwidths of the physical links of the transmitting device, so that the data packet can be transmitted while making use of the plurality of physical links effectively, and guaranteeing the stability of transmitting the data over the virtual links corresponding to the physical links, so the transmitting device can transmit the data over a plurality of links, thus making use of the resources in the network with a plurality of links effectively and improving the rate at which the data are transmitted.

Optionally the method further includes:

if handshake authentication needs to be performed on the receiving device, then performing, by the transmitting device, handshake authentication on the receiving device, and notifying the receiving device after handshake authentication is successful and it is determined that a virtual link can be set up for a physical link corresponding to an IP address notified by the receiving device; and receiving, by the transmitting device, an updated binding relationship between the virtual link and the physical link, from the receiving device.

In the embodiment above of the disclosure, if handshake authentication needs to be performed on the receiving device, then the transmitting device performs handshake authentication on the receiving device, and notifies the receiving device after handshake authentication is successful and it is determined that a virtual link can be set up for a physical link corresponding to an IP address notified by the receiving device; and the transmitting device receives an updated binding relationship between the virtual link and the physical link, from the receiving device. The transmitting device performs handshake authentication on the receiving device for which a virtual link needs to be set up, to thereby guarantee the legality of setting up the virtual link with the receiving device for the physical link of the transmitting device so that the encapsulated data packet can be transmitted over the reliable and secure virtual link and the data packet can be transmitted to the receiving device over the physical link corresponding to the virtual link, so the transmitting device can transmit the data packet reliably, and the transmitting device can transmit the data over a plurality of links effectively, thus making use of the resources in the network with a plurality of links effectively and improving the rate at which the data are transmitted.

Optionally the method further includes:

transmitting, by the transmitting device, a data packet corresponding to a virtual link over a physical link corresponding to another virtual link upon detecting that the virtual link is saturated, and transmitting the data packet corresponding to the resumed virtual link over a physical link corresponding to the resumed virtual link after the saturated virtual link is resumed.

In the embodiment above of the disclosure, the transmitting device can transmit a data packet corresponding to a virtual link over a physical link corresponding to another virtual link upon detecting that the virtual link is saturated, to thereby improve the reliability of transmission.

Optionally the method further includes:

updating, by the transmitting device, a binding relationship between the virtual link and a physical link after the receiving device notifies a released virtual link.

Optionally selecting, by the transmitting device, the virtual link over which a data packet needs to be transmitted, from the plurality of virtual links includes:

selecting, by the transmitting device, the virtual link over which a data packet needs to be transmitted, from the plurality of virtual links according to link quality values corresponding to the virtual links, which are determined according to link parameters of the physical links corresponding to the virtual links.

In the embodiment above of the disclosure, the transmitting device can select the virtual link over which a data packet needs to be transmitted, according to the link quality values corresponding to the virtual links, determined according to the link parameters of the physical links corresponding to the virtual links, so that the transmitting device can transmit the data packet over the physical link corresponding to the virtual link with a high network quality value, so the data packet can be transmitted reliably and effectively, and the data packet of the transmitting device can be transmitted over a plurality of links making full use of the plurality of physical links of the transmitting device, thus making use of the resources in the network with a plurality of links effectively and improving the rate at which the data are transmitted.

Optionally if the transmitting device is a terminal, then the receiving device is a VPN server; and if the transmitting device is a VPN server, then the receiving device is a terminal.

In the embodiment above of the disclosure, if the transmitting device is a terminal, then the data packet to be transmitted is a data packet requesting for a network access, so the terminal can set up the virtual link for the physical link to thereby guarantee reliable transmission of the data packet, and the data packet can be transmitted to the VPN server over the physical link of the terminal; and if the transmitting device is a VPN server, then the data packet to be transmitted will be an accessed network data packet, so the VPN server can set up the virtual link for the physical link to thereby guarantee reliable transmission of the data packet, and the data packet can be transmitted to the terminal over the physical link of the VPN server, so that the data packet to be transmitted can be transmitted over the physical of physical links between the terminal and the VPN server, so the data packet of the transmitting device can be transmitted over a plurality of links, thus making use of the resources in the network with a plurality of links effectively and improving the rate at which the data are transmitted.

In the embodiments of the disclosure, a transmitting device selects a virtual link over which a data packet needs to be transmitted, from a plurality of virtual links; the transmitting device determines a physical link corresponding to the selected virtual link according to a binding relationship between the virtual link and the physical link; and the transmitting device transmits the data packet to a receiving device over the determined physical link, where the data packet includes an IP address corresponding to the virtual link, and the plurality of virtual links correspond to the same IP address. The transmitting device determines the physical link corresponding to the selected virtual link according to the binding relationship between the virtual link and the physical link, and transmits the data packet to the receiving device over the physical link, so that the data can be transmitted over a plurality of links, that is, the physical links corresponding to the virtual links, via a plurality of network interfaces in a default route, thus making use of the resources in the network with a plurality of links effectively and improving the rate at which the data are transmitted.

Particularly in the embodiments of the disclosure, the binding relationship between the virtual link and the physical link can be invariable after it is set; or the binding relationship between the virtual link and the physical link can be updated according to hardware upgrade or as required by a user, particularly by one or more of the following operations without any limitation thereto:

Addition of the virtual link and/or the physical link;
Removal of the virtual link and/or the physical link; or
Modification of the virtual link and/or the physical link.

In order to make the technical problems, the technical solutions and the advantageous effects of the disclosure more apparent, the disclosure will be described below in further details with reference to the drawings and the embodiments thereof. It shall be appreciated that the particular embodiments described here are only intended to illustrate but not limit disclosure.

An embodiment of the disclosure provides a method for data transfer over a plurality of links, the method including: after handshake authentication with a receiving device is successful, a transmitting device sets up a virtual link for a physical link corresponding to an IP address of which the receiving device is notified during handshake authentication, and updates a binding relationship between the virtual link and the physical link; the transmitting device selects a virtual link over which a data packet needs to be transmitted, from a plurality of virtual links; the transmitting device determines the physical link corresponding to the selected virtual link according to the binding relationship between the virtual link and the physical link; and the transmitting device transmits the data packet to a receiving device over the determined physical link, where the data packet includes the IP address corresponding to the virtual link, and the plurality of virtual links correspond to the same IP address.

In the embodiment of the disclosure, the transmitting device may select the virtual link over which a data packet needs to be transmitted, from the plurality of virtual links after the binding relationship between the virtual link and the physical link between the transmitting device and the receiving device is updated. FIG. 1 illustrates a schematic diagram of a first method for data transfer over a plurality of links according to an embodiment of the disclosure.

S101. A transmitting device selects a virtual link over which a data packet needs to be transmitted, from a plurality of virtual links;

S102. The transmitting device determines a physical link corresponding to the selected virtual link according to a binding relationship between the virtual link and the physical link; and S103. The transmitting device transmits the data packet to a receiving device over the determined physical link, where the data packet includes the IP address corresponding to the virtual link, and the plurality of virtual links correspond to the same IP address.

In the embodiment of the disclosure, if the transmitting device is a terminal, then the receiving device will be a VPN server; and if the transmitting device is a VPN server, then the receiving device will be a terminal, both of which scenarios will be introduced below respectively.

In a first scenario, if the transmitting device is a terminal, then the receiving device will be a VPN server.

Figure 2A:
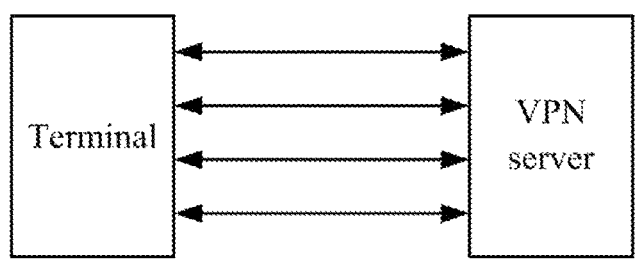
FIG. 2A is a schematic diagram of a second method for data transfer over a plurality of links according to an embodiment of the disclosure.

FIG. 2A illustrates a schematic diagram of a second method for data transfer over a plurality of links according to an embodiment of the disclosure. After handshake authentication between the terminal and the VPN server is successful, a terminal sets up a virtual link for a physical link corresponding to an IP address which is notified to the VPN server during handshake authentication; after the VPN server sets up the virtual link over the physical link corresponding to the notified IP address, the terminal updates a binding relationship between the virtual link and the physical link, and transmits the updated binding relationship between the virtual link and the physical link to the VPN server, so that the VPN server updates the binding relationship between the virtual link and the physical link in the VPN server with the updated binding relationship; the terminal selects a virtual link over which a data packet needs to be transmitted, from a plurality of virtual links; the terminal determines the physical link corresponding to the selected virtual link according to the binding relationship between the virtual link and the physical link, and transmits the data packet to the VPN server, where the data packet includes the IP address corresponding to the virtual link, and the plurality of virtual links correspond to the same IP address.

In the embodiment of the disclosure, during the handshake authentication between the terminal and the VPN server, the terminal transmits a virtual link connection request message including the source IP address and an IP address of the destination VPN server corresponding to the virtual link and a key; after the virtual link connection request message arrives at the VPN server, the VPN server performs handshake authentication on the source IP address, and the IP address of the destination VPN server and the key in the virtual link connection request message; and after handshake authentication is validated, handshake authentication between the terminal and the VPN server is successful, and the VPN server transmits to the terminal a response message including authentication success information, corresponding to the virtual link connection request message after handshake authentication is successful.

For example, if the virtual link connection request message transmitted by the terminal is {Source IP1, Key1, Destination IP2}, and configuration information in the VPN server is {Source IP2, Key1, Destination IP1}, then it may be indicated that a destination address of a virtual link to be set up with the terminal is IP2, and the IP address of the terminal is IP1, and that a destination address of a virtual link which can be set up with the VPN server is IP1, and the IP address of the VPN server is IP2, where an authentication key between the terminal and the VPN server is Key1, so the terminal is a legal user to the VPN server during handshake authentication, that is handshake authentication between the terminal and the VPN server is successful.

In the embodiment above of the disclosure, if the virtual link request message of the terminal is {Source IP3, Key1, Destination IP2}, and configuration information in the VPN server is {Source IP2, Key1, Destination IP1}, then it may be indicated that a destination address of a virtual link to be set up with the terminal is IP2, and the IP address of the terminal is IP1, and that a destination address of a virtual link which can be set up with the VPN server is IP1, and the IP address of the VPN server is IP2. Although an authentication key between the terminal and the VPN server is Key1, since the destination address of a virtual link which can be set up with the VPN server is IP1 instead of IP3, the terminal is not an illegal user to the VPN server during handshake authentication, so handshake authentication of the terminal with the VPN server is illegal, that is handshake authentication between the terminal and the VPN server fails.

In the embodiment above of the disclosure, if the virtual link request message of the terminal is {Source IP1, Key1, Destination IP2}, and configuration information in the VPN server is {Source IP2, Key2, Destination IP1}, then it may be indicated that a destination address of a virtual link to be set up with the terminal is IP2, the key is Key1, and the IP address of the terminal is IP1, and that a destination address of a virtual link which can be set up with the VPN server is IP1, the key is Key2, and the IP address of the VPN server is IP2. Although identity authentication in handshake authentication between the terminal and the VPN server is successful, since the key between the terminal and the destination of a virtual link to be set up with the terminal is Key1, and the key between the VPN server and the destination of a virtual link which can be set up with the VPN server is Key2 instead of Key1, there are different keys for the virtual link set up between the terminal and the VPN server during handshake authentication, so that no virtual link can be set up through handshake authentication, so handshake authentication between the terminal and the VPN server is not successful, that is handshake authentication between the terminal and the VPN server fails.

In an embodiment of the disclosure, after handshake authentication between the terminal and the VPN server is successful, the terminal receives a response message including handshake authentication success information, to the virtual link connection request message, from the VPN server, and the terminal sets up the virtual link over the physical link corresponding to the IP address of the VPN server, which is carried in the response message, and also updates the binding relationship between the virtual link and the physical link, and transmits the updated binding relationship between the virtual link and the physical link to the VPN server so that the VPN server updates the binding relationship between the virtual link and the physical link.

Optionally the binding relationship between the virtual link and the physical link is a binding relationship between the identifier of the virtual link and the IP address of the physical link.

For example, the updated binding relationship between the virtual link and the physical link, of the terminal in the embodiment of the disclosure is as depicted in Table 1. The IP address of a physical link 1 in the terminal is IP1, and the identifier of a corresponding virtual link set up over the physical link 1 is Tunnel4, so there is a binding relationship between the virtual link Tunnel4 and the physical link 1 is {IP1-Tunnel4}; the IP address of a physical link 2 in the terminal is IP2, and the identifier of a corresponding virtual link set up over the physical link 2 is Tunnel7, so there is a binding relationship between the virtual link Tunnel7 and the physical link 2 is {IP2-Tunnel7}; and the IP address of a physical link 3 in the terminal is IP3, and the identifier of a corresponding virtual link set up over the physical link 3 is Tunnel9, so there is a binding relationship between the virtual link Tunnel9 and the physical link 3 is {IP3-Tunnel9}. All the IP addresses of the virtual links Tunnel4, Tunnel7, and Tunnel9 are IPn.

TABLE 1

Binding relationship between virtual and physical link

| Physical link | Virtual link | Binding relationship |
|---|---|---|
| {IP1} | {Tunnel4} | {IP1- Tunnel4} |
| {IP2} | {Tunnel7} | {IP2- Tunnel7} |
| {IP3} | {Tunnel9} | {IP3- Tunnel9} |

In an implementation, the identifier of a virtual link may correspond to the IP address or addresses of one or more physical links.

In an embodiment of the disclosure, after the terminal updates the binding relationship between the virtual link and the physical link between the terminal and the VPN server, the terminal selects a virtual link over which a data packet needs to be transmitted, from a plurality of virtual links; the terminal determines the physical link corresponding to the selected virtual link according to the binding relationship between the virtual link and the physical link; and the terminal transmits the data packet to the VPN server over the determined physical link, where the data packet includes the IP address corresponding to the virtual link, and the plurality of virtual links correspond to the same IP address.

Optionally the terminal selects the virtual link over which a data packet needs to be transmitted, from the plurality of virtual links according to link quality values corresponding to the virtual links. The link quality values are determined according to link parameters of the physical links corresponding to the virtual links.

It shall be noted that the link parameter of the physical link corresponding to the virtual link can include any one or combination of: bandwidth of the link, ratio of lost packet on the link, delay of the link, etc., just to name a few, but will not be limited thereto as long as other parameter information capable of indicating the link parameter of the physical link can be applicable to the embodiment of the disclosure.

For example, if there is only one link parameter, i.e., link bandwidth, of the physical link corresponding to the virtual link, then the link quality value corresponding to the virtual link will be the link bandwidth; if there are two link parameters, i.e., link bandwidth and link ratio of lost packets on the link, of the physical link corresponding to the virtual link, then weighted value of the link bandwidth and the ratio of lost packet on the link can be calculated as the link quality value as a function of the link bandwidth and the ratio of lost packet of the link; and if there are three link parameters of the physical link corresponding to the virtual link, then also weighted value of the three link parameters can be calculated as the link quality value. The virtual link over which a data packet needs to be transmitted can be selected according to the link quality values of the physical links corresponding to the virtual links, and the data packet can be transmitted over the physical link corresponding to the selected virtual link.

In an embodiment of the disclosure where the link quality value of the physical link corresponding to the virtual link is determined by only the link bandwidth, for example, if a data packet 1 needs to be transmitted at a bandwidth of 1.5M; and the link bandwidth of a physical link 1 is 1M, the link bandwidth of a physical link 2 is 2M, and the link bandwidth of a physical link 1 is 3M, then in order to make full use of the link bandwidth of the physical link, and to save the bandwidth of the network without affecting the rate at which the data packet is transmitted, in the embodiment of the disclosure, a virtual link corresponding to the physical link 2 with the link bandwidth 2M is selected, and the data packet is encapsulated and transmitted over the physical link 2 of 2M.

In an embodiment of the disclosure where the link quality value of the physical link corresponding to the virtual link is determined by two link parameters which are the link bandwidth and the ratio of lost packet of link, for example, if there is more than one data packet to be transmitted, where there are six data packets to be transmitted, each of which has a data bandwidth of 1M, then the data packets will be transmitted in such an order of their security that the data packet 1, the data packet 2, the data packet 3, the data packet 4, the data packet 5, and the data packet 6 are transmitted sequentially; and there are only three physical links for the terminal, i.e., the physical link 1, the physical link 2, and the physical link 3. The ratio of lost packets of the physical link 1 is 0.01%, the ratio of lost packets of the physical link 2 is 0.005%, and the ratio of lost packets of the physical link 3 is 0.007%, and all the link bandwidths corresponding to these three physical links are 1M, so considering the data security required for the six data packets above, the physical link 2, the physical link 3, and the physical link 1 are selected to transmit the data packet 1, the data packet 2, and the data packet 3 respectively; and then the physical link 2, the physical link 3, and the physical link 1 are further selected to transmit the data packet 4, the data packet 5, and the data packet 6 respectively. Thus the data packets can be transmitted over the plurality of physical links between the terminal and the VPN server so that the data can be transmitted over a plurality of links in a default route of the network to thereby make use of the link resources in the network effectively. If there is only one data packet to be transmitted, then the physical link 2 may be selected to transmit the data packet according to weighted value of the ratio of lost packet of the link and the link width of the physical link, thus saving the network resources over which the data are transmitted.

In an embodiment of the disclosure, before the terminal transmits the data packet to the VPN server over the determined physical link, the terminal further encapsulates the data packet to be transmitted, in the L1TP protocol, and transmits the encapsulated data packet over the physical link corresponding to the virtual link.

It shall be noted that the encapsulation protocol above for the data packet to be transmitted in the embodiment of the disclosure has been described only by way of an example, but the embodiment of the disclosure will not be limited thereto as long as other encapsulation protocols for the data packet to be transmitted can be applicable to the embodiment of the disclosure.

The data packet may be encapsulated in the L2TP protocol as described below by way of an example. The terminal adds an L2TP header to a data frame to be transmitted, with the L2TP protocol to encapsulate the data frame to be transmitted, into an L2TP data frame, and adds a UDP header to the L2TP data frame to form a UDP packet; and the terminal adds a terminal public network IP header to the UDP packet, encapsulates the UDP packet into a public network IP packet to be transmitted over a VPN virtual link, and transmits the UDP packet from the terminal side to the VPN server side as data of the terminal over a physical link corresponding to an L2TP virtual link set up over the physical link. The VPN server removes the UDP header and the L2TP header sequentially from the received UDP packet to obtain the data frame to be transmitted, where the UDP packet includes the public network IP packet; and the public network IP packet includes the IP address of the terminal, and the IP address of the destination VPN server as well as the IP address of the selected physical link, and the identifier of the virtual link. The IP packet is transmitted to the server over the virtual link corresponding to the physical link.

Particularly the IP address of the terminal in the embodiment of the disclosure is the IP address corresponding to the virtual link, and the IP address corresponding to the virtual link in the embodiment of the disclosure corresponds to the real IP address of at least one physical link. In the embodiment of the disclosure, the terminal can locate the corresponding the VPN server accurately at the IP address of the VPN server.

For the higher layer, the data to be transmitted can be transmitted to a corresponding virtual network card at the IP address corresponding to the virtual link. Each network card corresponds to the identifier of at least one virtual link, and the virtual network card can determine over which physical link the data of the higher layer needs to be transmitted, according to the binding relationship between the identifier of the virtual link and the IP address of the physical link.

Optionally upon detecting that a virtual link corresponding to a physical link is saturated, the terminal transmits a data packet corresponding to the virtual link over another physical link corresponding to another virtual link, and after the saturated virtual link is resumed, the terminal transmits the data packet corresponding to the resumed virtual link over the physical link corresponding to the resumed virtual link.

Particularly the virtual link being saturated refers to that the amount of data being currently transmitted over the virtual link reaches a preset upper limit of the amount of data over the virtual link.

In a second scenario, if the transmitting device is a VPN server, then the receiving device may be a terminal.

Figure 2B:
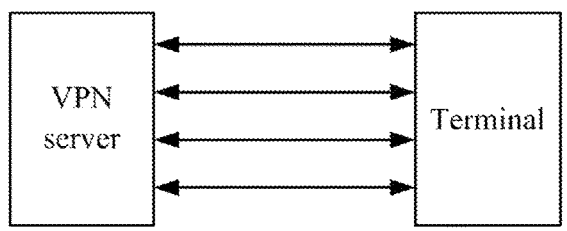
FIG. 2B is a schematic diagram of a third method for data transfer over a plurality of links according to an embodiment of the disclosure.

FIG. 2B illustrates a schematic diagram of a third method for data transfer over a plurality of links according to an embodiment of the disclosure. After handshake authentication between the VPN server and a terminal is successful, the VPN server sets up a virtual link for a physical link corresponding to an IP address of which the terminal is notified during handshake authentication; after the terminal sets up the virtual link over the physical link corresponding to the notified IP address, the VPN server updates a binding relationship between the virtual link and the physical link, and transmits the updated binding relationship between the virtual link and the physical link to the terminal, so that the terminal updates the binding relationship between the virtual link and the physical link, in the terminal with the updated binding relationship; the VPN server selects a virtual link over which a data packet needs to be transmitted, from a plurality of virtual links; the VPN server determines the physical link corresponding to the selected virtual link according to the binding relationship between the virtual link and the physical link, and transmits the data packet to the terminal, where the data packet includes the IP address corresponding to the virtual link, and the plurality of virtual links correspond to the same IP address.

In the embodiment of the disclosure, during the handshake authentication between the VPN server and the terminal, the VPN server transmits a virtual link connection request message including the source IP address and an IP address of the destination VPN server corresponding to the virtual link and a key to the terminal; after the virtual link connection request message arrives at the terminal, the terminal performs handshake authentication on the source IP address, and the IP address of the destination terminal and the key in the virtual link connection request message; and after handshake authentication is validated, handshake authentication between the VPN server and the terminal is successful, and the terminal transmits to the VPN server a response message including authentication success information, corresponding to the virtual link connection request message after handshake authentication is successful. Particularly a particular implementation of handshake authentication between the VPN server and the terminal may be the same as that in the first scenario, so a repeated description thereof will be omitted here.

In an embodiment of the disclosure, after handshake authentication between the VPN server and the terminal is successful, the VPN server receives a response message including handshake authentication success information, to the virtual link connection request message, from the terminal, and the VPN server sets up the virtual link over the physical link corresponding to the IP address of the terminal, carried in the response message, and also updates the binding relationship between the virtual link and the physical link, and transmits the updated binding relationship between the virtual link and the physical link to the terminal so that the terminal updates the binding relationship between the virtual link and the physical link.

Optionally the binding relationship between the virtual link and the physical link is a binding relationship between the identifier of the virtual link, and the IP address of the physical link.

In the embodiment of the disclosure, the updated binding relationship between the virtual link and the physical link, of the VPN server is the same as the binding relationship between the virtual link and the physical link in Table 1 in the first scenario, so a repeated description thereof will be omitted here. In an embodiment of the disclosure, after the VPN server updates the binding relationship between the virtual link and the physical link between the VPN server and the terminal, the VPN server selects a virtual link over which a data packet needs to be transmitted, from a plurality of virtual links; the VPN server determines the physical link corresponding to the selected virtual link according to the binding relationship between the virtual link and the physical link; and the VPN server transmits the data packet to the terminal over the determined physical link, where the data packet includes the IP address corresponding to the virtual link, and the plurality of virtual links correspond to the same IP address.

Optionally the VPN server selects the virtual link over which a data packet needs to be transmitted, from the plurality of virtual links according to link quality values corresponding to the virtual links, which are determined according to link parameters of the physical links corresponding to the virtual links.

In an implementation, the terminal in the embodiment of the disclosure can be a mobile device, e.g., a handset, a tablet computer, etc.; or can be a vehicular mobile device. If the solution according to the embodiment of the disclosure is applied to a vehicular mobile device, data can be transmitted over a plurality of virtual links to thereby improve the utilization ratio of a bandwidth in the vehicular system, where there is a higher network transmission speed of the vehicular antenna system than those of antenna systems in the 2G mode and the 3G mode to thereby provide a vehicle with high-speed network transmission so as to enable vehicular video communication, to watch high-definition videos, and to perform other similar activities in the vehicular.

In the embodiment of the disclosure, the VPN server can determine the link quality value of the virtual link according to the link parameter of the physical link corresponding to the virtual link in the same way as the link quality value of the virtual link is determined in the first scenario, so a repeated description thereof will be omitted here.

In an embodiment of the disclosure, before the VPN server transmits the data packet to the terminal over the determined physical link, the VPN server further encapsulates the data packet to be transmitted, with the L1TP protocol, and transmits the encapsulated data packet over the physical link corresponding to the virtual link.

In an embodiment of the disclosure, the VPN server may encapsulate the accessed data packet of the network in the L2TP protocol before the data packet is transmitted to the terminal, and since the VPN server can encapsulate the accessed data packet of the network in the L2TP protocol in the same way as the data packet of the network, to be accessed is encapsulated in the first scenario, a repeated description thereof will be omitted here.

Optionally upon detecting that the virtual link corresponding to a physical link is saturated, the VPN server transmits a data packet corresponding to the virtual link over another physical link corresponding to another virtual link, and after the saturated virtual link is resumed, the VPN server transmits the data packet corresponding to the resumed virtual link over the physical link corresponding to the resumed virtual link.

In the embodiments above of the disclosure, the VPN server sets up corresponding virtual links over a plurality of physical links between the VPN server and the terminal, and places binding relationships between the virtual links and the physical links into the VPN server and the terminal respectively; the VPN server selects a virtual link over which a data packet needs to be transmitted, from the plurality of virtual links upon reception of the data packet to be transmitted; the VPN server determines the physical link corresponding to the selected virtual link according to the binding relationship between the virtual link and the physical link; and the VPN server transmits the data packet to the terminal over the determined physical link, where the data packet includes the IP address corresponding to the virtual link, and the plurality of virtual links correspond to the same IP address. The data packet can be transmitted using link bandwidths of the respective physical links so that the network bandwidth of the VPN server will be the sum of the link bandwidths of the respective physical links, and the stability of a data connection can be guaranteed by the set-up virtual link corresponding to the physical link; and since the VPN server determines the physical link corresponding to the selected virtual link according to the binding relationship between the virtual link and the physical link, and transmits the data packet to the terminal, so that the data can be transmitted over a plurality of links, over the physical links corresponding to the virtual links via a plurality of network interfaces in a default route, thus making use of the resources in the network with a plurality of links effectively and improving the rate at which the data are transmitted.

In order to make the technical problem, the technical solution and the advantageous effect of the disclosure more apparent, the disclosure will be described below in further details with reference to the drawings and the embodiments thereof. It shall be appreciated that the particular embodiments described here are merely intended to illustrate but not limit the disclosure.

In an embodiment of the disclosure, if the terminal device can access wireless networks of three operators concurrently, i.e., China Unicom, China Mobile, and China Telecom, then there will be three physical network cards in the terminal device after the terminal dials up to the VPN server. An L2TP virtual network card is configured on the three physical network cards, and a list of interfaces is created to manage respective interfaces in the L2TP virtual network card; and a successfully configured interface is added to the list of interfaces, and a virtual link to transmit and receive data is added to the L2TP virtual network card. A data transmission function and reception function of the virtual network card are specified in the list of interfaces, where the transmission function is configured to traverse the network cards in the list of interfaces, and to select one of L2TP virtual network cards from the list of interfaces to encapsulate and transmit data; and the reception function is configured to de-encapsulate a data packet, to parse it for a real destination IP address, and to forward the data. Before the data is forwarded, network link related operations will be performed to traverse data of the network cards, and a network card state detection event is added, where if a network card is located as a result of traversal and an Up event of the network card is detected, then a virtual link and an interface will be set up for the network card; and if a Down event thereof is detected, then the virtual link and the interface thereof will be released.

In the embodiment above of the disclosure, if the respective network cards dial in L2TP up respectively to a VPN server, then a virtual network card of the VPN server is configured with an IP address of 10.252.1.1, where a Dynamic Host Configuration Protocol (DHCP) server is started on the virtual network card of the VPN server to configure the VPN server with the IP address of the virtual network card. A DHCP client is started on the virtual network card of the terminal, and if there are virtual links to the VPN server, in the list of interfaces in the virtual network card of the terminal, then the virtual network card of the terminal will obtain the IP address of 10.252.1.1, and a corresponding virtual link will be selected from the virtual network card of the terminal to forward the data packet. The terminal selects the corresponding virtual link according to network quality values of the physical network cards corresponding to the virtual links, where weighted values of network parameters of the respective physical network cards are calculated as the network quality values corresponding to the virtual links. If the data packet to be transmitted includes 2.5M data, and all the link bandwidths of the China Unicom physical network card, the China Mobile physical network card, and the China Telecom physical network card are 1M, then the data packet will be forwarded concurrently over these three physical network cards, that is, the link bandwidth of a physical network card transmitting the data packet at this time is the sum 3M of the link bandwidths of these three physical network cards, so that the data packet to be transmitted can be transmitted over a plurality of links, through these three physical network cards in the virtual network card of the terminal, thus making use of the resources in the network with a plurality of links effectively and improving the rate at which the data are transmitted.

In the embodiment above of the disclosure, if all the link bandwidths of the China Unicom physical network card, the China Mobile physical network card, and the China Telecom physical network card are 1M, and the weighted values of the ratios of lost packets and the link delays of the virtual links corresponding to the physical network cards above are 0.07, 0.05 and 0.01 respectively, then if there are six data packets to be transmitted, each of which has a bandwidth of 1M, where the data packet 1 to the data packet 6 are sorted in a descending order of their required reliability of data in transmission, i.e., the data packet 1, the data packet 2, the data packet 3, the data packet 4, the data packet 5, and the data packet 6, then the data will be transmitted by selecting the physical network cards corresponding to the respective virtual links according to the network link quality values, where the data packet 1 is transmitted through the China Telecom physical network card, the data packet 2 is transmitted through the China Mobile physical network card, and the data packet 3 is transmitted through the China Unicom physical network card, and further the data packet 4 is transmitted through the China Telecom physical network card, the data packet 5 is transmitted through the China Mobile physical network card, and the data packet 6 is transmitted through the China Unicom physical network card, so that the data packets can be transmitted over a plurality of links, through the three physical network cards above, thus making use of the resources in the network with a plurality of links effectively and improving the rate at which the data are transmitted.

Figure 2C:
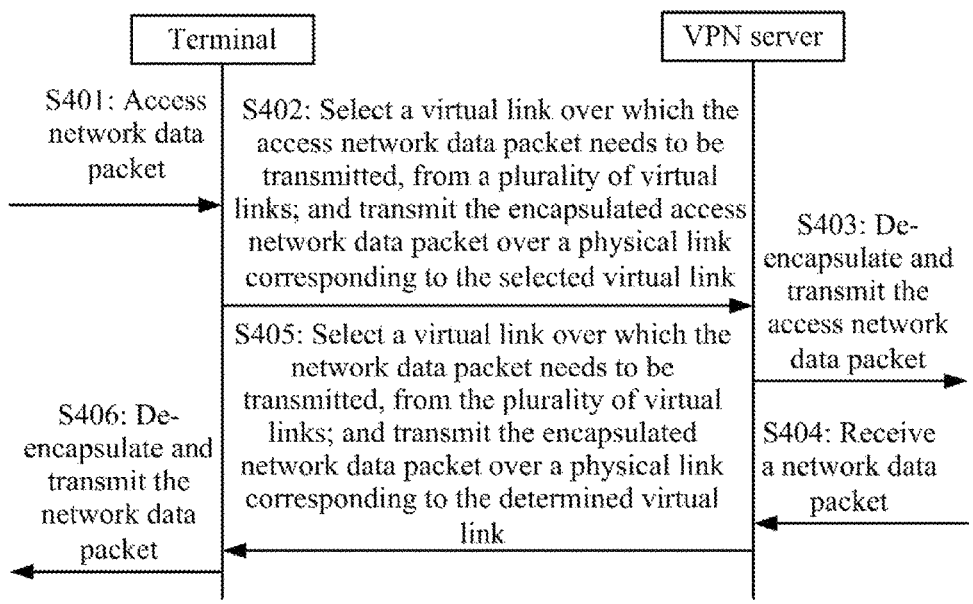
FIG. 2C is a schematic diagram of a fourth method for data transfer over a plurality of links according to an embodiment of the disclosure.

FIG. 2C illustrates a schematic diagram of a fourth method for data transfer over a plurality of links according to an embodiment of the disclosure.

S401. A terminal receives an access network data packet, which includes network data to be accessed;

S402. The terminal selects a virtual link over which the access network data packet needs to be transmitted, from a plurality of virtual links; and transmits the encapsulated access network data packet over a physical link corresponding to the selected virtual link;

S403. A VPN server transmits the received encapsulated access network data packet to a network for which the access network data packet is required, after de-encapsulating the access network data packet;

S404. The VPN server receives an accessed network data packet;

S405. The VPN server selects a virtual link over which the network data packet needs to be transmitted, from the plurality virtual links; and transmits the encapsulated network data packet over a physical link corresponding to the determined virtual link; and S406. The terminal de-encapsulates and transits the accessed network data packet received.

In the step S402 and the step S405, the virtual link over which the network data packet needs to be transmitted, is selected from the plurality virtual links according to link quality values corresponding to the virtual links, which are determined according to link parameters of the physical links corresponding to the virtual links; and in the steps S402 and S405 and the steps S403 and S406, both the operations of encapsulating and de-encapsulating the access network data packet or the accessed network data packet are performed in the L2TP protocol.

Figure 3:
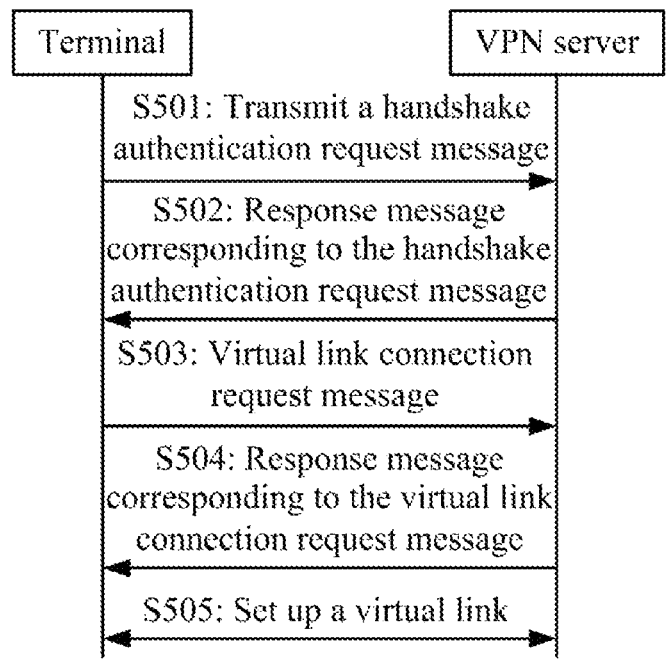
FIG. 3 is a schematic diagram of a method for setting up a virtual link between a terminal and a VPN server according to an embodiment of the disclosure.

The method further includes setting up the virtual link corresponding to the physical link between the terminal and the VPN server before the terminal receives the access network data packet, and FIG. 3 illustrates a schematic diagram of a method for setting up a virtual link between a terminal and a VPN server according to an embodiment of the disclosure.

S501. A terminal transmits a handshake authentication request message to a VPN server;

S502. The VPN server performs handshake authentication on the terminal, and transmits a response message corresponding to the handshake authentication request message, to the terminal after handshake authentication is successful;

S503. The terminal transmits a virtual link connection request message to the VPN server upon reception of the response message corresponding to the handshake authentication request message after handshake authentication is successful;

S504. The VPN server transmits a response message to the virtual link connection request message, to the terminal, and sets up a virtual link over a physical link in the virtual link connection request message; and S505. The terminal sets up the virtual link over the physical link in the virtual link connection request message, between the terminal and the VPN server according to the response message corresponding to the virtual link connection request message.

In the embodiments above of the disclosure, selects a virtual link over which a data packet needs to be transmitted, from a plurality of virtual links; the transmitting device determines a physical link corresponding to the selected virtual link according to a binding relationship between the virtual link and the physical link; and the transmitting device transmits the data packet to a receiving device over the determined physical link, where the data packet includes an IP address corresponding to the virtual link, and the plurality of virtual links correspond to the same IP address. The transmitting device determines the physical link corresponding to the selected virtual link according to the binding relationship between the virtual link and the physical link, and transmits the data packet to the receiving device, so that the data can be transmitted over a plurality of links, over the physical links corresponding to the virtual links via a plurality of network interfaces in a default route, thus making use of the resources in the network with a plurality of links effectively and improving the rate at which the data are transmitted.

Figure 4A:
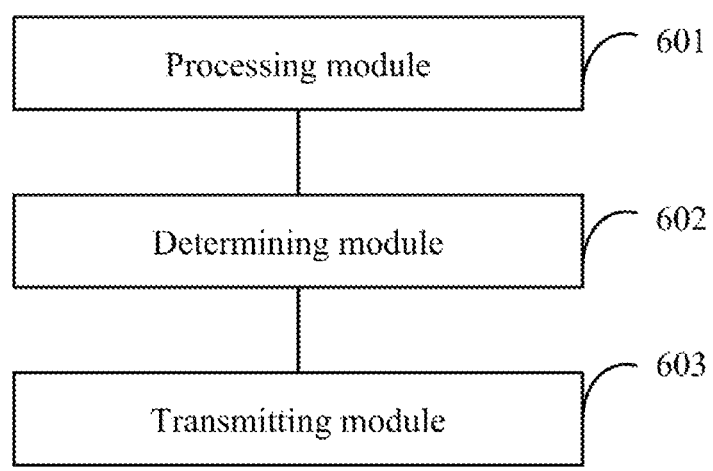
FIG. 4A is a structural diagram of a device for data transfer over a plurality of links according to an embodiment of the disclosure.

Based upon the same technical idea, an embodiment of the disclosure provides a device for data transfer over a plurality of links, which can perform the embodiments of the method above. FIG. 4A illustrates a structural diagram of a device for data transfer over a plurality of links according to an embodiment of the disclosure.

A device for data transfer over a plurality of links according to an embodiment of the disclosure includes:

A processing module 601 is configured to select a virtual link over which a data packet needs to be transmitted, from a plurality of virtual links;

A determining module 602 is configured to determine a physical link corresponding to the selected virtual link according to a binding relationship between the virtual link and the physical link; and A transmitting module 603 is configured to transmit the data packet to a receiving device over the determined physical link, where the data packet includes an IP address corresponding to the virtual link, and the plurality of virtual links correspond to the same IP address.

In the embodiment of the disclosure, if the device is a terminal, then the receiving device will be a VPN server; and if the device is a VPN server, then the receiving device will be a terminal, both of which scenarios will be introduced below respectively.

In a first scenario, if the device is a terminal, then the receiving device will be a VPN server.

In an embodiment of the disclosure, after handshake authentication to the VPN server is successful, the processing module 601 sets up a virtual link for a physical link corresponding to an IP address which is notified to the VPN server by the processing module 601 during handshake authentication; after the VPN server sets up the virtual link over the physical link corresponding to the notified IP address, the determining module 602 updates a binding relationship between the virtual link and the physical link, and transmits the updated binding relationship between the virtual link and the physical link to the VPN server, so that the VPN server updates the binding relationship between the virtual link and the physical link, in the VPN server with the updated binding relationship; the determining module 602 selects the virtual link over which a data packet needs to be transmitted, from the plurality of virtual links; and the transmitting module 603 determines the physical link corresponding to the virtual link selected by the determining module 602 according to the binding relationship between the virtual link and the physical link, and transmits the data packet to the VPN server, where the data packet includes the IP address corresponding to the virtual link, and the plurality of virtual links correspond to the same IP address.

In the embodiment of the disclosure, during the processing module 601 performs the handshake authentication to the VPN server, the processing module 601 transmits a virtual link connection request message including the source IP address, and an IP address of the destination VPN server corresponding to the virtual link and a key; after the virtual link connection request message arrives at the VPN server, the VPN server performs handshake authentication on the source IP address, and the IP address of the destination VPN server and the key in the virtual link connection request message; and after handshake authentication is validated, handshake authentication between the processing module 601 and the VPN server is successful, and the VPN server transmits to the processing module 601 a response message including authentication success information, corresponding to the virtual link connection request message after handshake authentication is successful.

For example, if the virtual link connection request message of the processing module 601 is {Source IP1, Key1, Destination IP2}, and configuration information in the VPN server is {Source IP2, Key1, Destination IP1}, then it may be indicated that the destination address of the virtual link to be set up by the processing module 601 is IP2, and the IP address of the processing module 601 is IP1, and that a destination address of a virtual link which can be set up by the VPN server is IP1, and the IP address of the VPN server is IP2, where an authentication key between the processing module 601 and the VPN server is Key1, so the processing module 601 is a legal user to the VPN server during handshake authentication, that is handshake authentication between the terminal and the VPN server is successful.

In the embodiment above of the disclosure, if the virtual link request message of the processing module 601 is {Source IP3, Key1, Destination IP2}, and configuration information in the VPN server is {Source IP2, Key1, Destination IP1}, then it may be indicated that the destination address of the virtual link to be set up by the processing module 601 is IP2, and the IP address of the processing module 601 is IP1, and that a destination address of a virtual link which can be set up by the VPN server is IP1, and the IP address of the VPN server is IP2, where although an authentication key between the processing module 601 and the VPN server is Key1, since the destination address of a virtual link which can be set up by the VPN server is IP1 instead of IP3, the processing module 601 is an illegal user to the VPN server during handshake authentication, so handshake authentication of the processing module 601 to the VPN server is illegal, that is handshake authentication between the processing module 601 and the VPN server fails.

In the embodiment above of the disclosure, if the virtual link request message of the processing module 601 is {Source IP1, Key1, Destination IP2}, and configuration information in the VPN server is {Source IP2, Key2, Destination IP1}, then it may be indicated that the destination address of the virtual link to be set up by the processing module 601 is IP2, a key is Key1, and the IP address of the processing module 601 is IP1, and that a destination address of a virtual link which can be set up by the VPN server is IP1, a key is Key2, and the IP address of the VPN server is IP2, where although identity authentication in handshake authentication between the processing module 601 and the VPN server is successful, since the key between the processing module 601 and the destination of the virtual link to be set up by the processing module 601 is Key1, and the key between the VPN server and the destination of a virtual link which can be set up by the VPN server is Key2 instead of Key1, there are different keys for the virtual link set up between the processing module 601 and the VPN server during handshake authentication so that no virtual link can be set up through handshake authentication, so handshake authentication between the processing module 601 and the VPN server is unsuccessful, that is handshake authentication between the processing module 601 and the VPN server fails.

In an embodiment of the disclosure, after handshake authentication between the processing module 601 and the VPN server is successful, the processing module 601 receives a response message including handshake authentication success information, to the virtual link connection request message, from the VPN server, and the processing module 601 sets up the virtual link over the physical link corresponding to the IP address of the VPN server, carried in the response message, and also updates the binding relationship between the virtual link and the physical link, and transmits the updated binding relationship between the virtual link and the physical link to the VPN server so that the VPN server updates the binding relationship between the virtual link and the physical link.

Optionally the determining module 602 is configured:

To determine the binding relationship between the virtual link and the physical link as a binding relationship between the identifier of the virtual link, and the IP address of the physical link.

Optionally the processing module 601 is further configured:

To determine an IP address which is notified to the receiving device during handshake authentication, and to set up a virtual link for a physical link corresponding to the determined IP address, after handshake authentication with the receiving device is successful; and To update a binding relationship between the virtual link and the physical link, and to transmit the updated binding relationship between the virtual link and the physical link to the receiving device.

Optionally the processing module 601 is further configured:

If handshake authentication needs to be performed on the receiving device, to perform handshake authentication on the receiving device, and to notify the receiving device after handshake authentication is successful and it is determined that a virtual link can be set up for a physical link corresponding to an IP address notified by the receiving device; and To receive an updated binding relationship between the virtual link and the physical link, from the receiving device.

For example, the updated binding relationship between the virtual link and the physical link, of the processing module 601 in the embodiment of the disclosure is as depicted in Table 1, where the IP address of a physical link 1 in the processing module 601 is IP1, and the identifier of a corresponding virtual link set up over the physical link 1 is Tunnel4, so there is a binding relationship between the virtual link Tunnel4 and the physical link 1 is {IP1-Tunnel4}; the IP address of a physical link 2 in the processing module 601 is IP2, and the identifier of a corresponding virtual link set up over the physical link 2 is Tunnel7, so there is a binding relationship between the virtual link Tunnel7 and the physical link 2 is {IP2-Tunnel7}; and the IP address of a physical link 3 in the processing module 601 is IP3, and the identifier of a corresponding virtual link set up over the physical link 3 is Tunnel9, so there is a binding relationship between the virtual link Tunnel9 and the physical link 3 is {IP3-Tunnel9}.

In an embodiment of the disclosure, after the processing module 601 updates the binding relationship between the virtual link and the physical link between the processing module 601 and the VPN server, the processing module 601 selects the virtual link over which a data packet needs to be transmitted, from the plurality of virtual links; the determining module 602 determines the physical link corresponding to the selected virtual link according to the binding relationship between the virtual link and the physical link; and the transmitting module 603 transmits the data packet to the VPN server over the determined physical link. The data packet includes the IP address corresponding to the virtual link, and the plurality of virtual links correspond to the same IP address.

Optionally the processing module 601 selects the virtual link over which a data packet needs to be transmitted, from the plurality of virtual links according to link quality values corresponding to the virtual links, which are determined according to link parameters of the physical links corresponding to the virtual links.

It shall be noted that the link parameter of the physical link corresponding to the virtual link can include any one or combination of: link bandwidth, ratio of lost packet of link, link delay, etc., just to name a few, but will not be limited thereto as long as other parameter information capable of indicating the link parameter of the physical link can be applicable to the embodiment of the disclosure.

For example, if there is only one link parameter, i.e., link bandwidth, of the physical link corresponding to the virtual link, then the link quality value corresponding to the virtual link will be the link bandwidth; if there are two link parameters, i.e., link bandwidth and ratio of lost packet of link, of the physical link corresponding to the virtual link, then weighted value of the link bandwidth and the ratio of lost packet of link can be calculated as the link quality value as a function of the link bandwidth and the ratios of lost packet of link; and if there are three link parameters of the physical link corresponding to the virtual link, then also weighted value of the three link parameters can be calculated as the link quality value, and the virtual link over which a data packet needs to be transmitted can be selected according to the link quality values of the physical links corresponding to the virtual links, and the data packet can be transmitted over the physical link corresponding to the virtual link.

In an embodiment of the disclosure where the link quality value of the physical link corresponding to the virtual link is determined by only the link bandwidth, for example, if a data packet 1 needs to be transmitted at a bandwidth of 1.5M; and the link bandwidth of a physical link 1 is 1M, the link bandwidth of a physical link 2 is 2M, and the link bandwidth of a physical link 1 is 3M, then in order to make full use of the link bandwidth of the physical link, and to save the bandwidth of the network without affecting the rate at which the data packet is transmitted, in the embodiment of the disclosure, a virtual link corresponding to the physical link 2 with the link bandwidth of 2M is selected, and the data packet is encapsulated and transmitted over the physical link 2 of 2M.

In an embodiment of the disclosure where the link quality value of the physical link corresponding to the virtual link is determined by two link parameters which are the link bandwidth and the ratios of lost packet, for example, if there is more than one data packet to be transmitted, where there are six data packets to be transmitted, each of which has a data bandwidth of 1M, then the data packets may be transmitted in such an order of their security that the data packet 1, the data packet 2, the data packet 3, the data packet 4, the data packet 5, and the data packet 6 are transmitted sequentially; and there are only three physical links of the terminal, i.e., the physical link 1, the physical link 2, and the physical link 3, where the ratio of lost packets of the physical link 1 is 0.01%, the ratio of lost packets of the physical link 2 is 0.005%, and the ratio of lost packets of the physical link 3 is 0.007%, and all the link bandwidths corresponding to these three physical links are 1M, so considering the data security required for the six data packets above, the physical link 2, the physical link 3, and the physical link 1 are selected to transmit the data packet 1, the data packet 2, and the data packet 3 respectively; and then the physical link 2, the physical link 3, and the physical link 1 are further selected to transmit the data packet 4, the data packet 5, and the data packet 6 respectively. Thus the data packets can be transmitted over the plurality of physical links between the terminal and the VPN server so that the data can be transmitted over a plurality of links in a default route of the network to thereby make use of the link resources in the network effectively. If there is only one data packet to be transmitted, then the physical link 2 may be selected to transmit the data packet according to weighted values of the ratios of lost packets and the link widths of the physical links, thus saving the network resources over which the data are transmitted.

In an embodiment of the disclosure, before the transmitting module 603 transmits the data packet to the VPN server over the determined physical link, the transmitting module 603 further encapsulates the data packet to be transmitted, with the L1TP protocol, and transmits the encapsulated data packet over the physical link corresponding to the virtual link.

It shall be noted that the encapsulation protocol above of the data packet to be transmitted in the embodiment of the disclosure has been described only by way of an example, but the embodiment of the disclosure will not be limited thereto as long as other encapsulation protocols of the data packet to be transmitted can be applicable to the embodiment of the disclosure.

The data packet may be encapsulated with the L2TP protocol as described below by way of an example. The transmitting module 603 adds an L2TP header to a data frame to be transmitted, with the L2TP protocol to encapsulate the data frame to be transmitted, into an L2TP data frame, and adds a UDP header to the L2TP data frame to form a UDP packet; and the transmitting module 603 adds a public network IP header of the transmitting module 603 to the UDP packet, encapsulates the UDP packet into a public network IP packet to be transmitted over a VPN virtual link, and transmits the UDP packet from the terminal side to the VPN server side as data of the transmitting module 603 over a physical link corresponding to an L2TP virtual link set up over the physical link, and the VPN server removes the UDP header and the L2TP header sequentially from the received UDP packet to obtain the data frame to be transmitted, where the public network IP packet includes the IP address of the source terminal, and the IP address of the destination VPN server, and the UDP packet includes the public network IP packet; and the transmitting module 603 encapsulates the binding relationship between the IP address corresponding to the physical link, and the identifier of the virtual link corresponding to the physical link into the IP packet, and transmits the IP packet to the VPN server over the virtual link corresponding to the physical link.

Optionally the determining module 602 is further configured:

Upon detecting that a virtual link is saturated, to transmit a data packet corresponding to the virtual link over a physical link corresponding to another virtual link, and after the saturated virtual link is resumed, to transmit the data packet corresponding to the resumed virtual link over a physical link corresponding to the resumed virtual link.

Optionally the determining module 602 is further configured:

To update a binding relationship between a virtual link and a physical link after the receiving device notifies the released virtual link.

In a second scenario, if the device for data transfer is a VPN server, then the receiving device may be a terminal.

In an embodiment of the disclosure, after handshake authentication to the terminal is successful, the processing module 601 sets up a virtual link for a physical link corresponding to an IP address which is notified to the terminal during handshake authentication; after the terminal sets up the virtual link over the physical link corresponding to the notified IP address, the determining module 602 updates a binding relationship between the virtual link and the physical link, and transmits the updated binding relationship between the virtual link and the physical link to the terminal, so that the terminal updates the binding relationship between the virtual link and the physical link, in the terminal with the updated binding relationship; the determining module 602 selects a virtual link over which a data packet needs to be transmitted, from a plurality of virtual links; and determines the physical link corresponding to the selected virtual link according to the binding relationship between the virtual link and the physical link, and the transmitting module 603 transmits the data packet to the terminal over the determined physical link corresponding to the selected virtual link, where the data packet includes the IP address corresponding to the virtual link, and the plurality of virtual links correspond to the same IP address.

In the embodiment of the disclosure, the processing module 601 transmits a virtual link connection request message including the source IP address and an IP address of the destination VPN server corresponding to the virtual link and a key during handshake authentication to the terminal; after the virtual link connection request message arrives at the terminal, the terminal performs handshake authentication on the source IP address, and the IP address of the destination VPN server and the key in the virtual link connection request message; and after handshake authentication is validated, handshake authentication between the processing module 601 and the terminal is successful, and the terminal transmits to the processing module 601 a response message including authentication success information, corresponding to the virtual link connection request message after handshake authentication is successful. Particularly a particular implementation of handshake authentication between the VPN server and the terminal may be the same as that in the first scenario, so a repeated description thereof will be omitted here.

In an embodiment of the disclosure, after handshake authentication between the processing module 601 and the terminal is successful, the processing module 601 receives a response message including handshake authentication success information, to the virtual link connection request message, from the terminal, and the processing module 601 server sets up the virtual link over the physical link corresponding to the IP address of the terminal, carried in the response message, and also updates the binding relationship between the virtual link and the physical link, and transmits the updated binding relationship between the virtual link and the physical link to the terminal so that the terminal updates the binding relationship between the virtual link and the physical link.

Optionally the binding relationship between the virtual link and the physical link is a binding relationship between the identifier of the virtual link, and the IP address of the physical link.

In the embodiment of the disclosure, the updated binding relationship between the virtual link and the physical link, of the processing module 601 is the same as the binding relationship between the virtual link and the physical link in Table 1 in the first scenario, so a repeated description thereof will be omitted here.

In an embodiment of the disclosure, after the processing module 601 updates the binding relationship between the virtual link and the physical link between the processing module 601 and the terminal, the processing module 601 selects the virtual link over which a data packet needs to be transmitted, from the plurality of virtual links; the determining module 602 determines the physical link corresponding to the selected virtual link according to the binding relationship between the virtual link and the physical link; and the transmitting module 603 transmits the data packet to the terminal over the determined physical link, where the data packet includes the IP address corresponding to the virtual link, and the plurality of virtual links correspond to the same IP address.

Optionally the processing module 601 selects the virtual link over which a data packet needs to be transmitted, from the plurality of virtual links according to link quality values corresponding to the virtual links, which are determined according to link parameters of the physical links corresponding to the virtual links.

In the embodiment of the disclosure, the processing module 601 can determine the link quality values of the virtual links according to the link parameters of the physical links corresponding to the virtual links in the same way as the link quality values of the virtual links are determined in the first scenario, so a repeated description thereof will be omitted here.

In an embodiment of the disclosure, before the transmitting module 603 transmits the data packet to the terminal over the determined physical link, the transmitting module 603 further encapsulates the data packet to be transmitted, with the L1TP protocol, and transmits the encapsulated data packet over the physical link corresponding to the virtual link.

In an embodiment of the disclosure, the VPN server encapsulates an accessed network data packet with the L2TP protocol before the data packet is transmitted to the terminal, and since the VPN server encapsulates the accessed network data packet with the L2TP protocol in the same way as the network data packet to be accessed is encapsulated in the first scenario, a repeated description thereto will be omitted here.

Optionally upon detecting that a virtual link is saturated, the determining module 602 transmits a data packet corresponding to the saturated virtual link over a physical link corresponding to another virtual link, and after the saturated virtual link is resumed, transmits the data packet corresponding to the resumed virtual link over a physical link corresponding to the resumed virtual link.

Figure 4B:
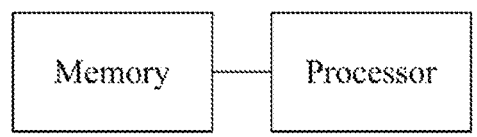
FIG. 4B is a structural diagram of another device for data transfer over a plurality of links according to an embodiment of the disclosure.

An embodiment of the disclosure further provides another device for data transfer over a plurality of links, which can perform the embodiments of the method above. FIG. 4B illustrates a structural diagram of a device for data transfer over a plurality of links according to an embodiment of the disclosure.

As illustrated in FIG. 4B, a device for data transfer over a plurality of links, the device includes: one or more processors; and a memory; where the memory has computer readable program codes stored therein, and the one or more processors are configured to execute the computer readable program codes to perform: selecting at least one virtual link over which a data packet needs to be transmitted, from a plurality of virtual links; determining a physical link corresponding to the selected virtual link according to a binding relationship between the virtual link and the physical link; and transmitting the data packet to a receiving device over the determined physical link; where the data packet includes an Internet Protocol (IP) address corresponding to the virtual link, and the plurality of virtual links correspond to the same IP address.

Optionally, the binding relationship between the virtual link and the physical link is a binding relationship between an identifier of the virtual link and the IP address of the physical link.

Optionally, before the selecting the virtual link over which the data needs to be transmitted, from the plurality of virtual links, the one or more processors are further configured to perform: determining an IP address which is notified to the receiving device during handshake authentication, and setting up a virtual link for a physical link corresponding to the determined IP address, after the handshake authentication between the device for data transfer and the receiving device is successful; and updating a binding relationship between the virtual link and the physical link, and transmitting the updated binding relationship between the virtual link and the physical link to the receiving device.

Optionally, the one or more processors are further configured to perform: if handshake authentication needs to be performed on the receiving device, then performing the handshake authentication on the receiving device, and notifying the receiving device after the handshake authentication is successful and it is determined that a virtual link can be set up for a physical link corresponding to an IP address notified by the receiving device; and receiving an updated binding relationship between the virtual link and the physical link, from the receiving device.

Optionally, the one or more processors are further configured to perform: upon detecting that a virtual link is saturated, transmitting a data packet corresponding to the saturated virtual link over a physical link corresponding to another virtual link, and after the saturated virtual link is resumed, transmitting the data packet corresponding to the resumed virtual link over a physical link corresponding to the resumed virtual link.

Optionally, the one or more processors are further configured to perform: updating a binding relationship between the virtual link and a physical link after the receiving device notifies a released virtual link.

Optionally, selecting the virtual link over which the data packet needs to be transmitted, from the plurality of virtual links includes: selecting the virtual link over which the data packet needs to be transmitted, from the plurality of virtual links according to link quality values corresponding to the virtual links, link quality values being determined according to link parameters of the physical links corresponding to the virtual links.

In the embodiments above of the disclosure, the VPN server sets up corresponding virtual links over a plurality of physical links between the VPN server and the terminal, and places binding relationships between the virtual links and the physical links into the VPN server and the terminal respectively; the VPN server selects a virtual link over which a data packet needs to be transmitted, from the plurality of virtual links upon reception of the data packet to be transmitted; the VPN server determines the physical link corresponding to the selected virtual link according to the binding relationship between the virtual link and the physical link; and the VPN server transmits the data packet to the terminal over the determined physical link, where the data packet includes the IP address corresponding to the virtual link, and the plurality of virtual links correspond to the same IP address. The data packet can be transmitted using link bandwidths of the respective physical links so that the network bandwidth of the VPN server will be the sum of the link bandwidths of the respective physical links, and the stability of a data connection can be guaranteed by the set-up virtual link corresponding to the physical link; and since the VPN server determines the physical link corresponding to the selected virtual link according to the binding relationship between the virtual link and the physical link, and transmits the data packet to the terminal, so that the data can be transmitted over a plurality of links, over the physical links corresponding to the virtual links via a plurality of network interfaces in a default route, thus making use of the resources in the network with a plurality of links effectively and improving the rate at which the data are transmitted.

In an implementation, the embodiments of the disclosure can be applicable to a vehicular system to thereby enable high-speed video transfer in the vehicular system according to the solutions of the embodiments of the disclosure.

Two structures of a vehicular system will be given in the following embodiments, where FIG. 5 to FIG. 11 illustrate a first vehicular system, and FIG. 12 to FIG. 23 illustrate a second vehicular system.

Figure 5:
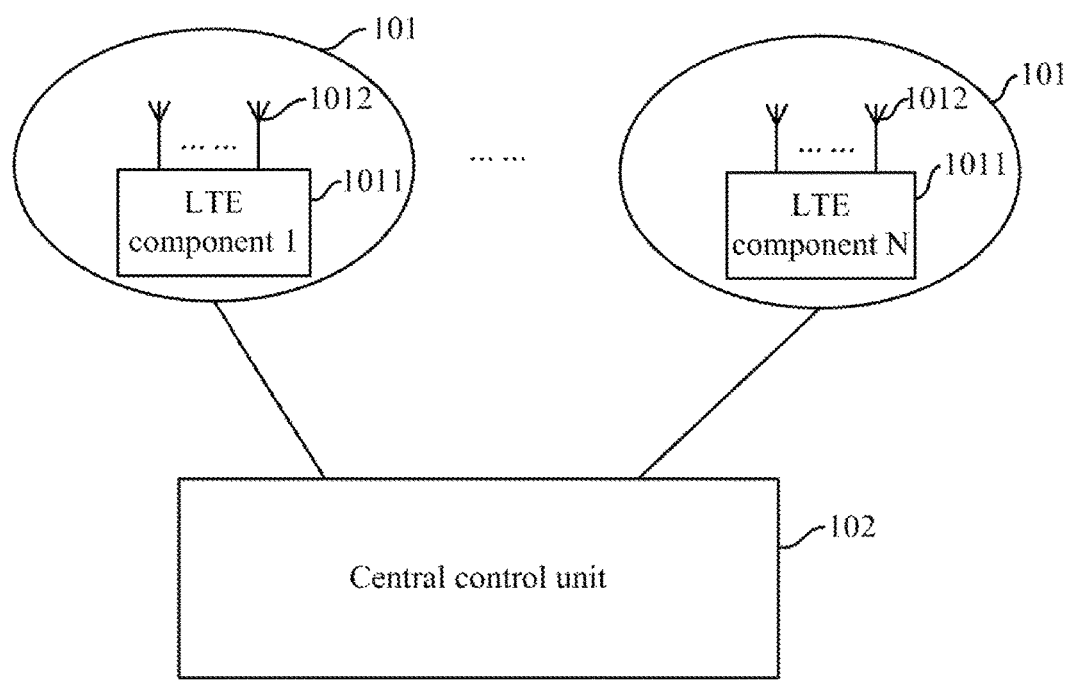
FIG. 5 is a schematic structural diagram of a vehicular antenna system according to an embodiment of the disclosure.

FIG. 5 illustrates a schematic structural of a vehicular antenna system, and as illustrated in FIG. 5, the vehicular antenna system includes:

A central control unit 102, and a plurality of LTE modules 101, each of which includes an LTE component 1011 and at least one antenna component 1012, where the LTE component 1011 is connected with the antenna component 1012, and the central control unit 102 is connected with each of the LTE modules 101.

The central control unit 102 includes the all units in FIG. 4A or includes all units in FIG. 4B, and transmits or receives information through the LTE modules 101 if necessary.

The LTE module performs transmission processing on information to be transmitted, output by the central control unit 102, and then sends out, and performs reception processing on received information and then outputs to the central control unit 102.

The LTE component 1011 in the LTE module 101 can perform second generation (2G), third generation (3G), and fourth generation (4G) communication, and the LTE component 1011 can receive and transmit signals through the corresponding antenna component 1012 to communicate with an external network.

As illustrated in FIG. 5, each of the plurality of LTE modules 101 corresponds to one LTE component 1011, the LTE component 1011 is connected with two antenna components 1012. Alternatively the LTE component 1011 can be connected with one antenna component 1012 although there will be better communication performance of the LTE component 1011 if there are a larger number of antenna components 1012 connected therewith.

If there is only one LTE module 101, then there will be a higher network transmission speed of the vehicular antenna system than those of antenna systems in the 2G mode and the 3G mode. If there are a plurality of LTE modules 101, then a vehicle can be provided with high-speed network transmission through the plurality of LTE modules 101 in the vehicular antenna system due to aggregation of a plurality of carriers to thereby enable vehicular video communication, watch high-definition videos, and perform other similar activities in the vehicle. The embodiment of the disclosure can improve the network transmission speed over the prior art.

The TE component 1011 can be arranged on a Printed Circuit Board (PCB), where the LTE components 1011 are integrated on the PCB, and antenna feed pins of the antenna components 1012 can be pressed on antenna feed points on the PCB, and electrically connected with their corresponding LTE components 1011 through wirings on the PCB.

The antenna component 1012 can be fabricated in a number of process including at least the following several processes:

First Scheme

The antenna component 1012 is fixed on an antenna bracket of the PCB, where the antenna component 1012 is supported by the antenna bracket fixed on the PCB, so that the antenna feed pins of the antenna component 1012 can be pressed on the antenna feed points on the PCB.

Second Scheme

The antenna component 1012 is formed by etching a Flexible Printed Circuit (FPC). The FPC, which is covered by a mask with an antenna pattern, is exposed, and then a metal layer on the exposed FPC is etched, thus fabricating the antenna components 1012 in the form of a labyrinth. The antenna component 1012 fabricated in the FPC process are compact in structure and convenient to install, and the FPC can be affixed on the casing of a structure through a back-adhesive, e.g., on the outer casing of the LTE module 101, possibly on the outside or the inside of non-metal portion of the outer casing of the module, or on the surface of non-metal casing, or the FPC can be affixed on the PCB. The antenna component 1012 fabricated this way has the advantage of a high wiring density, a low weight, high bendability, etc.

Third Scheme

The antenna component 1012 is formed on the casing of a structure piece by laser carving with Laser Direct Structuring (LDS). Metal powers are laser carved onto the casing of any structure piece in an LDS process, e.g., on the outer casing of the LTE module 101, possibly on the outside or the inside of non-metal part of the outer casing of the module, or on the surface of non-metal casing. The antenna component 1012 fabricated this way can be designed with any antenna pattern and formed on the casing of a structural piece by laser carving in any shape flexibly without being restricted by the structural modality of a product, and can be prevented from being interfered with by metal in the LTE module 101, and also the volume of the LTE module 101 can be lowered.

Figure 6A:
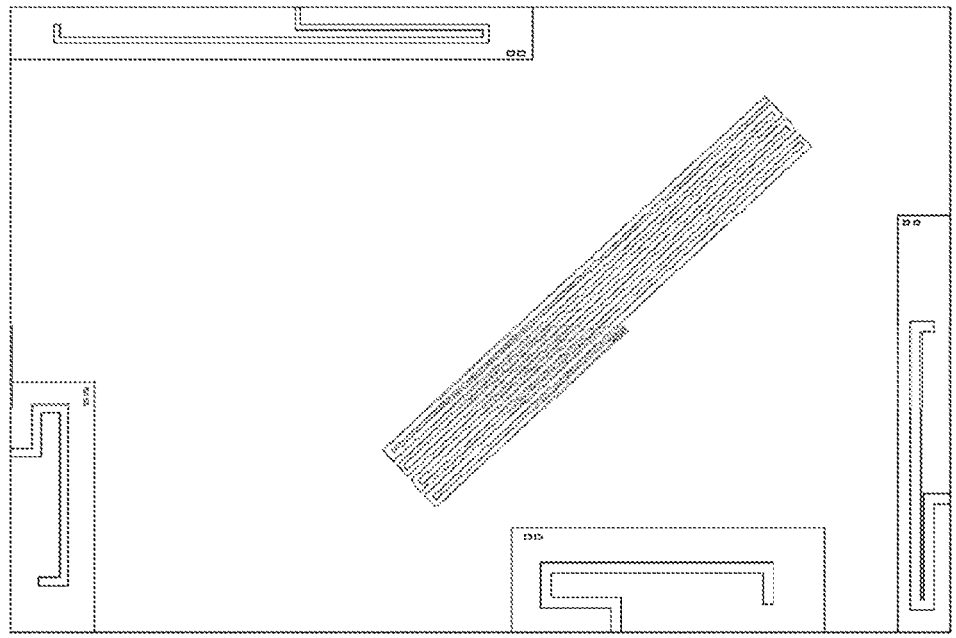
FIG. 6A is a first schematic structural diagram of an antenna component according to an embodiment of the disclosure.
Figure 6B:
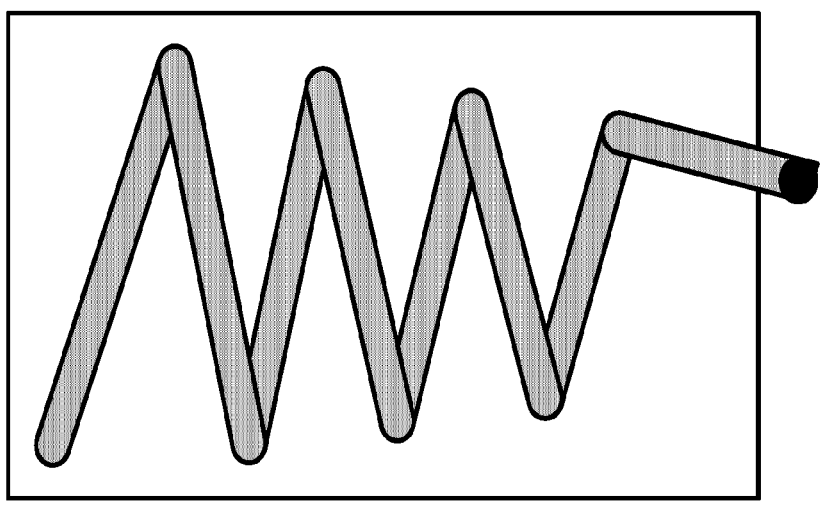
FIG. 6B is a second schematic structural diagram of an antenna component according to an embodiment of the disclosure.
Figure 6C:
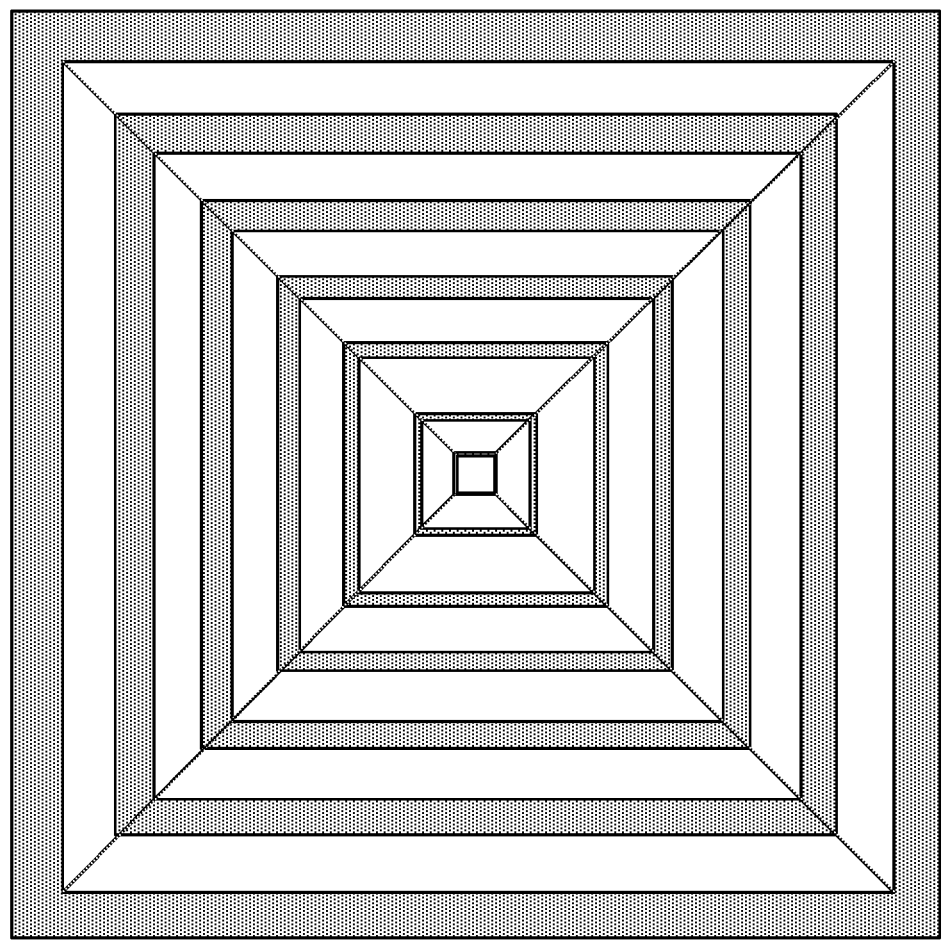
FIG. 6C is a third schematic structural diagram of an antenna component according to an embodiment of the disclosure.
Figure 6D:
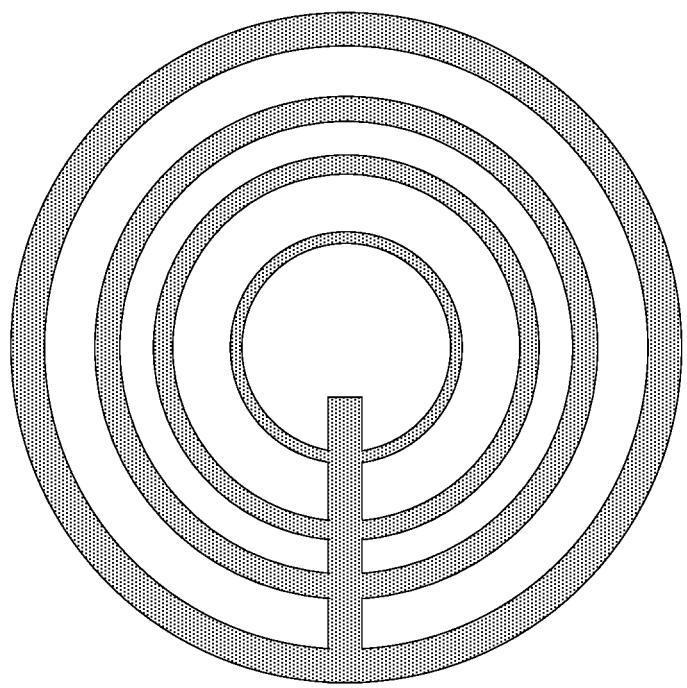
FIG. 6D is a fourth schematic structural diagram of an antenna component according to an embodiment of the disclosure.

Correspondingly, embodiments of the disclosure further provide schematic structural diagrams of several antenna components 1012 as illustrated in FIG. 6A to FIG. 6D. FIG. 6A illustrates a sectional view of an antenna component 1012, i.e., a cross section view of the antenna component 1012, and as can be apparent from FIG. 6a, the pattern structure of the antenna component 1012 is printed on an FPC. FIG. 6B illustrates an antenna component 1012 fabricated from an FPC, where the black dot represents an antenna feed pin. FIG. 6C and FIG. 6D illustrate antenna patterns of two antenna components 1012 respectively, which are an annular structure and a "回"-shaped structure respectively. The antenna component 1012 can be fabricated in either of these two patterns, where the FPC is etched in the pattern, thus forming the antenna component 1012, or metal powers are laser carved through LDS to form either of the patterns. The pattern of the antenna component 1012 can be designed freely in a practical application.

The three schemes above in which the antenna component 1012 is fabricated have been described in the embodiments of the disclosure only as examples, but the process in which the antenna component 1012 is fabricated will not be limited to these schemes, so the embodiments of the disclosure will not be limited thereto.

Figure 7:
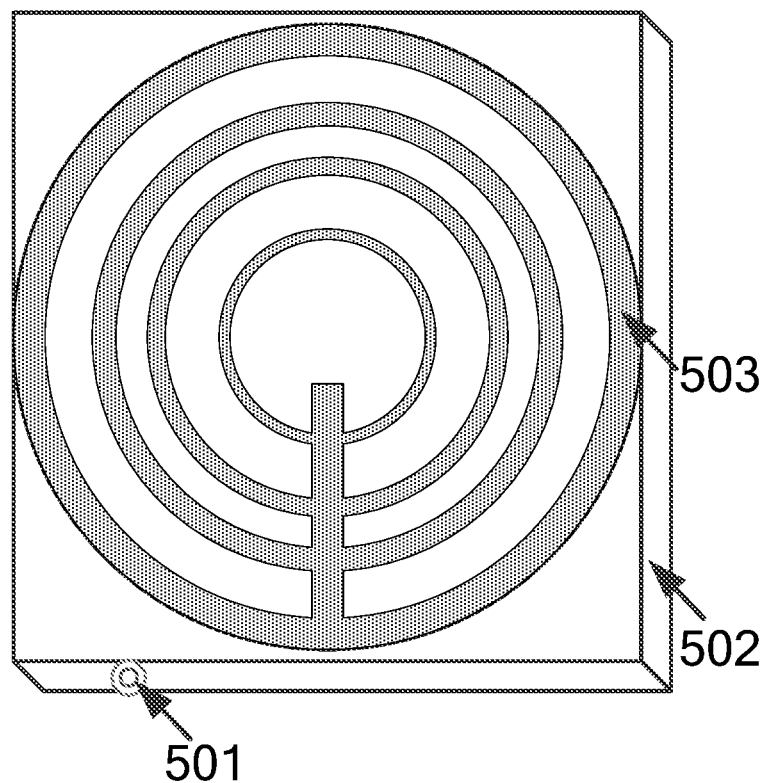
FIG. 7 is a schematic structural diagram of an LTE module according to an embodiment of the disclosure.

Each of the LTE modules 101 in the embodiments of the disclosure can be designed into a separate modular box, and FIG. 7 illustrates a schematic diagram of a structured LTE module 101. As illustrated in FIG. 7, the antenna component 1012 is formed on the top of the box by laser carving with LDS, for example, in an antenna pattern 303. The LTE component 1011 in the LTE module 101 can intercommunicate with the central control unit 102 through a bundle of USB lines. Each of the boxes includes a box body 502, and a reserved USB interface 501, where the USB interface can be compatible with a number of USB versions, although the embodiment of the disclosure is used with the USB Version 3.0; and the LTE module 101 communicates with and is powered by the central control unit 102 through a bundle of USB 3.0 lines. The modular box further includes primary and secondary antennas of the LTE component 1011 to transmit and receive signals. The antennas can be designed as directional antennas with a radiation angle less than or equal to 180°, so that really designed radiation faces of the antennas can be positioned as a function of surroundings of different positions where they are installed.

The appearance of each of the boxes can be designed for a real application but will not be limited to the cuboid. Also the antenna components 1012 can be formed by laser carving on the four sides of the modular box in a real application, where the antennas are designed as directional antennas, and the radiation surfaces of the antenna components 1012 can be designed as a function of the varying positions where they are installed. In an embodiment of the disclosure, preferably the antenna components 1012 are positioned on the face of the modular box facing passengers, that is, the antenna components 1012 are formed by laser carving on the top of the modular box or positioned on the four sides of the modular box.

Figure 8:
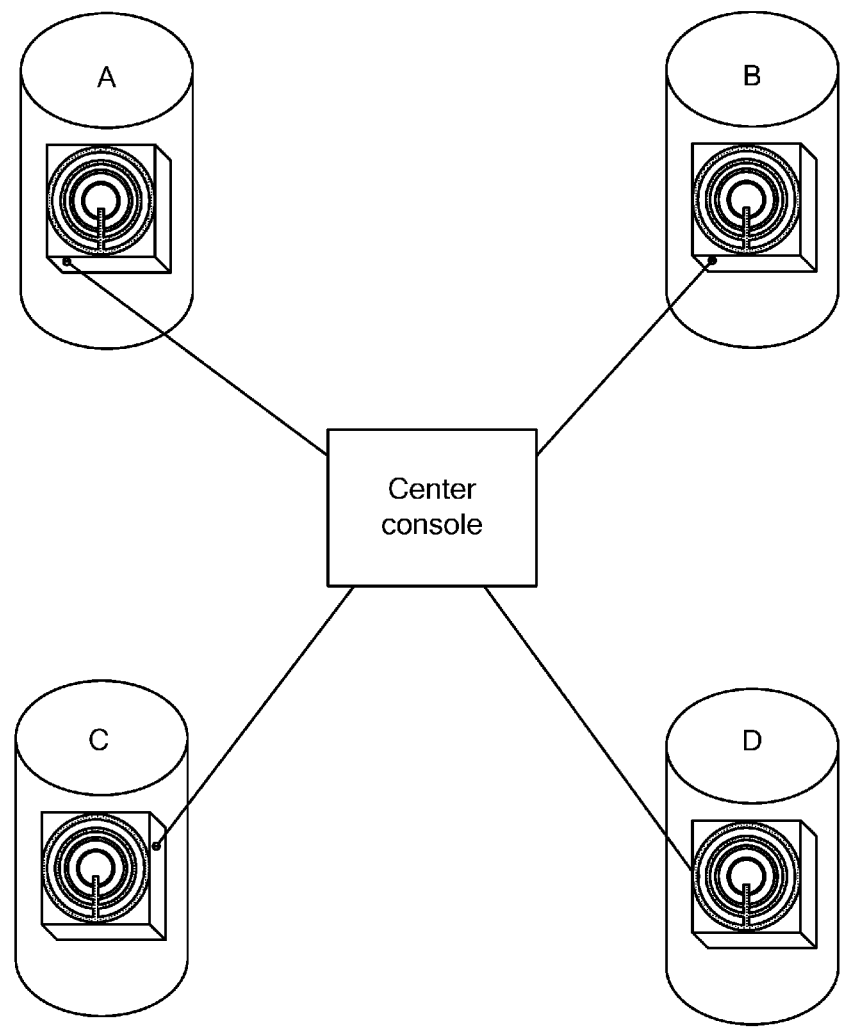
FIG. 8 is a schematic diagram of the position of LTE modules according to an embodiment of the disclosure.

For better high-speed communication of the vehicular antenna system, a plurality of LTE modules 101 can be positioned throughout the vehicle, and as illustrated in FIG. 8, the LTE modules 101 can be positioned so that they are installed in a column A, a column B, a column C, or a column D of the vehicle, and then they can be connected with the central control unit 102 of the center console of the vehicle through a USB bus to communicate with the central control unit 102.

Figure 9:
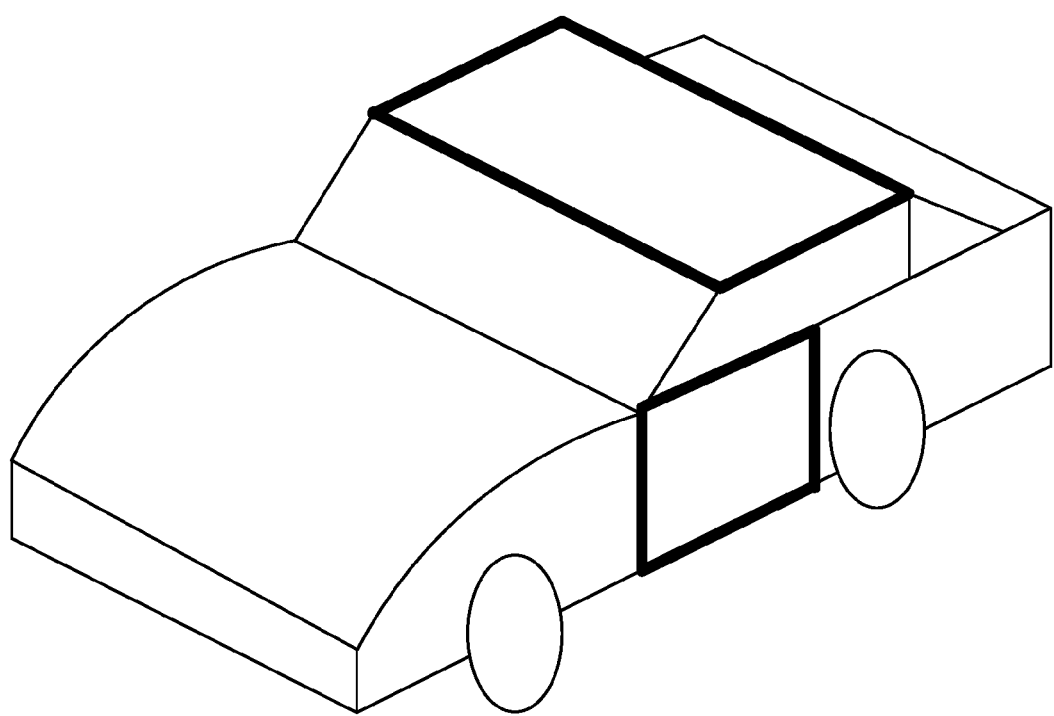
FIG. 9 is a schematic diagram of the position of LTE modules according to an embodiment of the disclosure.

In an embodiment of the disclosure, the LTE modules 101 can alternatively be positioned on any one or more of the outside of the roof of the vehicle, the inside of the door of the vehicle, a platform at the bottom of the front windshield of the vehicle, a platform at the bottom of the rear windshield of the vehicle, or the rearview mirror of the vehicle. If there are a large number of LTE modules 101 required for the vehicle, then more than one of them can be co-located, and there will be a higher quality of high-speed communication if there are a large number of LTE modules 101 in use. As illustrated in FIG. 9, the LTE modules 101 can be installed on the outside of the roof of the vehicle, and the inner side of the door of the vehicle, in the zones delimited by the bold lines in black in FIG. 9.

FIG. 5 illustrates N LTE modules 101, all of which are connected with the central control unit 102, where if there are a larger number of LTE modules 101 connected with the central control unit 102, then there will be better performance, and possible high-speed communication, e.g., at 10 Gb/s, 20 Gb/s, etc., of the vehicular antenna system. Signals received by the LTE modules 101 are transmitted to the central control unit 102 for processing.

In an embodiment of the disclosure, the central control unit 102 is connected with each of the LTE modules 101 through a Universal Serial Bus (USB) bus. Both the central control unit 102 and the LTE modules 101 are provided with USB interfaces, where the USB interfaces of the central control unit 102 and the LTE modules 101 are connected respectively by the USB bus.

Since antenna systems of vehicles in the prior art are designed with single antenna, the vehicles can receive various signals only if a plurality of antennas are installed on the vehicles, but these antennas have to be installed on the outsides of the roofs of the vehicles, thus increasing the instability of the vehicles. Unlike the prior art, the LTE components 1011 and the antenna components 1012 are integrated in the LTE modules 101 according to the embodiments of the disclosure, where the LTE modules 101 can be positioned throughout the vehicle instead of being installed on the outside of the roof of the vehicle to thereby improving the stability of the vehicle.

Figure 10:
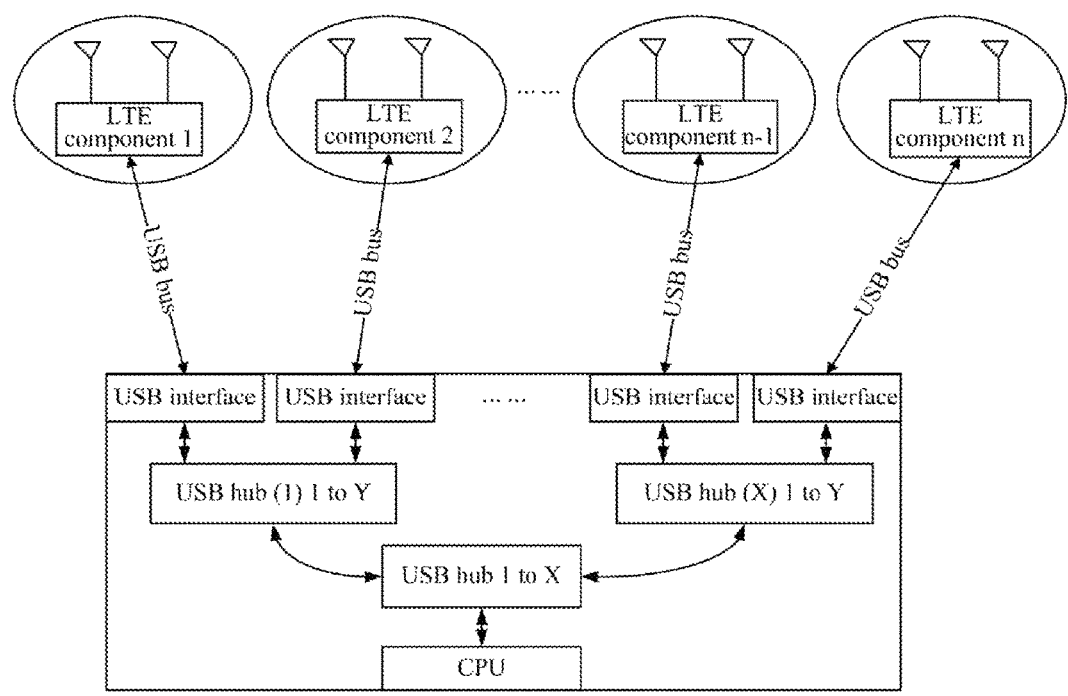
FIG. 10 is a schematic structural diagram of a vehicular antenna system according to an embodiment of the disclosure.

As illustrated in FIG. 10, an embodiment of the disclosure provides a connection scheme of the central control unit 102 with the LTE modules 101. The LTE modules 101 are connected with the USB interfaces in the central control unit 102 through the USB bus, where each of the LTE modules 101 corresponds to one of the USB interfaces. In the central control unit 102, the plurality of USB interfaces are connected with USB hubs, each of which can connect Y USB interfaces, where Y is more than or equal to 1, for example, four USB interfaces can be connected by one of the USB hubs. There are X USB hubs, where X is more than or equal to 1, and the X USB hubs are connected onto a single USB hub and connected with a CPU of the central control unit 102 through the single USB hub.

In an embodiment of the disclosure, a larger number of LTE modules 101 can be combined as required for networking, where the LTE modules 101 are distributed throughout the vehicle to thereby lower the difficulty of assembling the vehicular antenna system in order for arbitrary combination. If necessary, then the designed LTE module 101 boxes will be simply connected with the central control unit 102 in the center console. Also as compared with the traditional design, they can communicate concurrently with the central control unit 102 through the USB bus to thereby lower effectively a loss of radio frequency power due to a coaxial line, thus improving the performance of radio frequency, and to alleviate a constraint on the length of the bundle of lines between the LTE modules 101 and the central control unit 102, thus making it more flexible to position the LTE modules 101.

Figure 11:
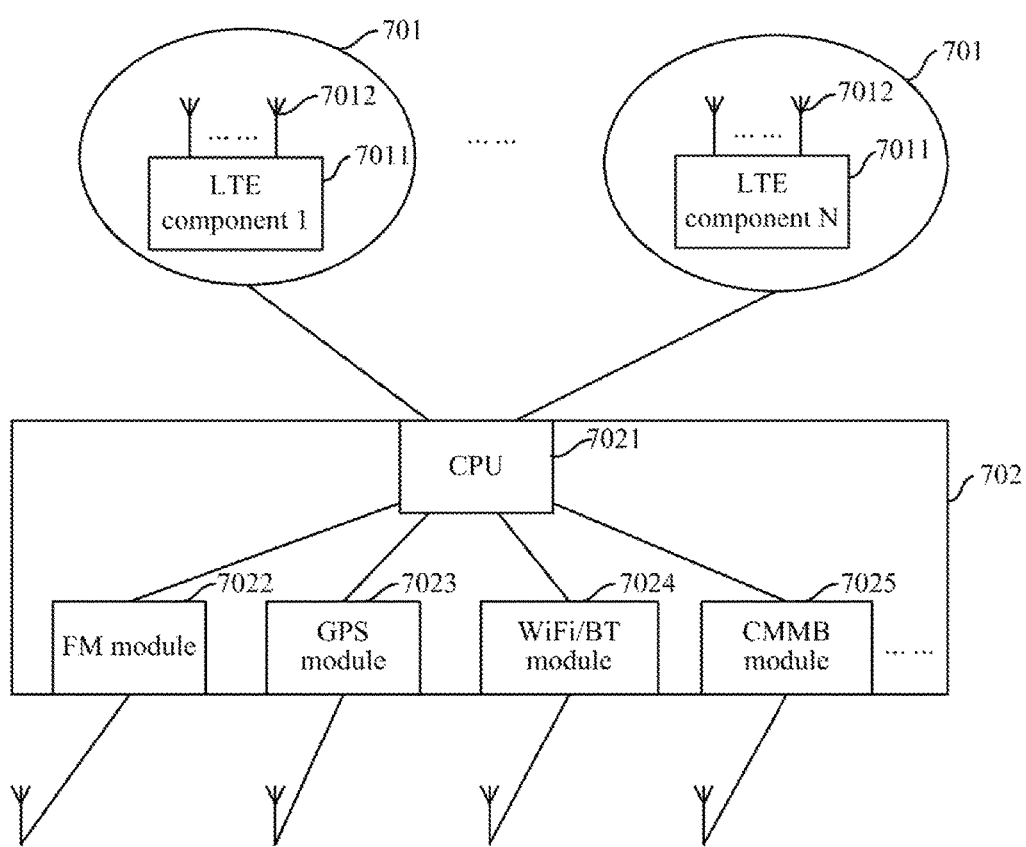
FIG. 11 is a schematic structural diagram of a vehicular antenna system according to an embodiment of the disclosure.

Correspondingly an embodiment of the disclosure further provides a vehicular antenna system, structured as illustrated in FIG. 11, which includes a central control unit 702, and a plurality of LTE modules 701, each of which includes an LTE component 7011 and at least one antenna component 7012, where the LTE component 7011 is connected with the at least one antenna component 7012, and the central control unit 702 is connected with each of the LTE modules 701.

The central control unit 702 includes all units in FIG. 4A or includes all units in FIG. 4B, and transmits or receives information through the LTE modules 701 if necessary.

A Central Processing Unit (CPU) 7021, an FM module 7022, a GPS module 7023, a WiFi/BT module 7024, and a CMMB module 7025 are arranged on a PCB of the central control unit 702, and the vehicular antenna system further includes an FM antenna, a GPS antenna, a WiFi/BT antenna and a CMMB antenna corresponding to the FM module 7022, the GPS module 7023, the WiFi/BT module 7024, and the CMMB module 7025. The FM antenna, the GPS antenna, the WiFi/BT antenna and the CMMB antenna are sequentially connected with the central control unit 702 at terminals through coaxial lines.

The central control unit 702 is connected with each of the LTE modules 701 through a Universal Serial Bus (USB) bus. Both the central control unit 702 and the LTE modules 701 are arranged with USB interfaces, where the USB interfaces of the central control unit 702 and the LTE modules 701 are connected respectively by the USB bus. Based upon the same inventive idea, an embodiment of the disclosure further provides a vehicle including the vehicular antenna system above structured particularly as described in the embodiments above, so a repeated description thereof will be omitted here.

In the embodiment of the disclosure, the plurality of LTE modules can be connected with the central control unit to thereby enable high-speed communication through the vehicular antennas, and the LTE components can be integrated together with the antenna components so that the LTE modules can be installed flexibly to thereby avoid the problem of communication interference arising from the plurality of LTE components gathering in the central control unit.

A structure of another vehicular antenna system will be described below in details.

Figure 12:
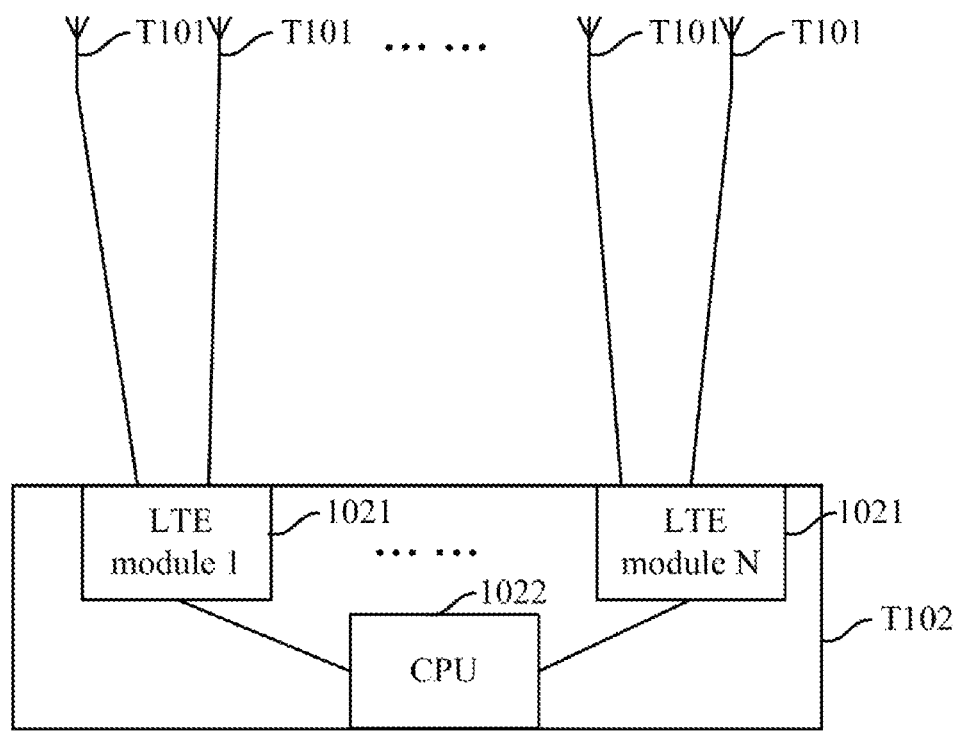
FIG. 12 is a schematic structural diagram of a vehicular antenna system according to an embodiment of the disclosure.

FIG. 12 illustrates a schematic structural of a vehicular antenna system, and as illustrated in FIG. 12, the vehicular antenna system includes:

A central control unit T102, and a plurality of antenna modules T101, where the central control unit T102 includes a Central Processing Unit (CPU) 1022, and a plurality of LTE modules 1021, each of the LTE modules 1021 in the central control unit T102 is connected with at least one of the antenna modules T101, and the plurality of LTE modules 1021 are connected with the CPU 1022.

The central control unit T102 includes all units in FIG. 4A or includes all units in FIG. 4B, and transmits or receives information through the antenna modules T101 if necessary.

The antenna modules T101 perform transmission processing on information to be transmitted, output by the central control unit T102, and then send out and perform reception processing on the received information and then output to the central control unit T102.

The LTE modules 1021 can perform second generation (2G), third generation (3G), and fourth generation (4G) communication, and each of the LTE modules 1021 can receive and transmit signals through their corresponding antenna modules T101 to communicate with an external network.

As illustrated in FIG. 12, each of the plurality of LTE modules 1021 is connected with two antenna modules T101, which are a primary antenna and a secondary antenna respectively. Alternatively the LTE module 1021 can be connected with one antenna module T101 although there will be better communication performance of the LTE module 1021 if there are a larger number of antenna modules T101 connected therewith.

If there is only one LTE module 1021, then there will be a higher network transmission speed of the vehicular antenna system than those of antenna systems in the 2G mode and the 3G mode. If there are a plurality of LTE modules 1021 and a plurality of antenna modules T101, then a vehicle can be provided with high-speed network transmission through the plurality of LTE modules 1021 and the plurality of antenna modules T101 in the vehicular antenna system due to aggregation of a plurality of carriers to thereby enable vehicular video communication, watch high-definition videos, and perform other similar activities in the vehicle. The embodiment of the disclosure can improve the network transmission speed over the prior art.

The antenna module T101 in the embodiment of the disclosure can be fabricated in a number of processes including at least the following several processes:

First Scheme

Figure 13:
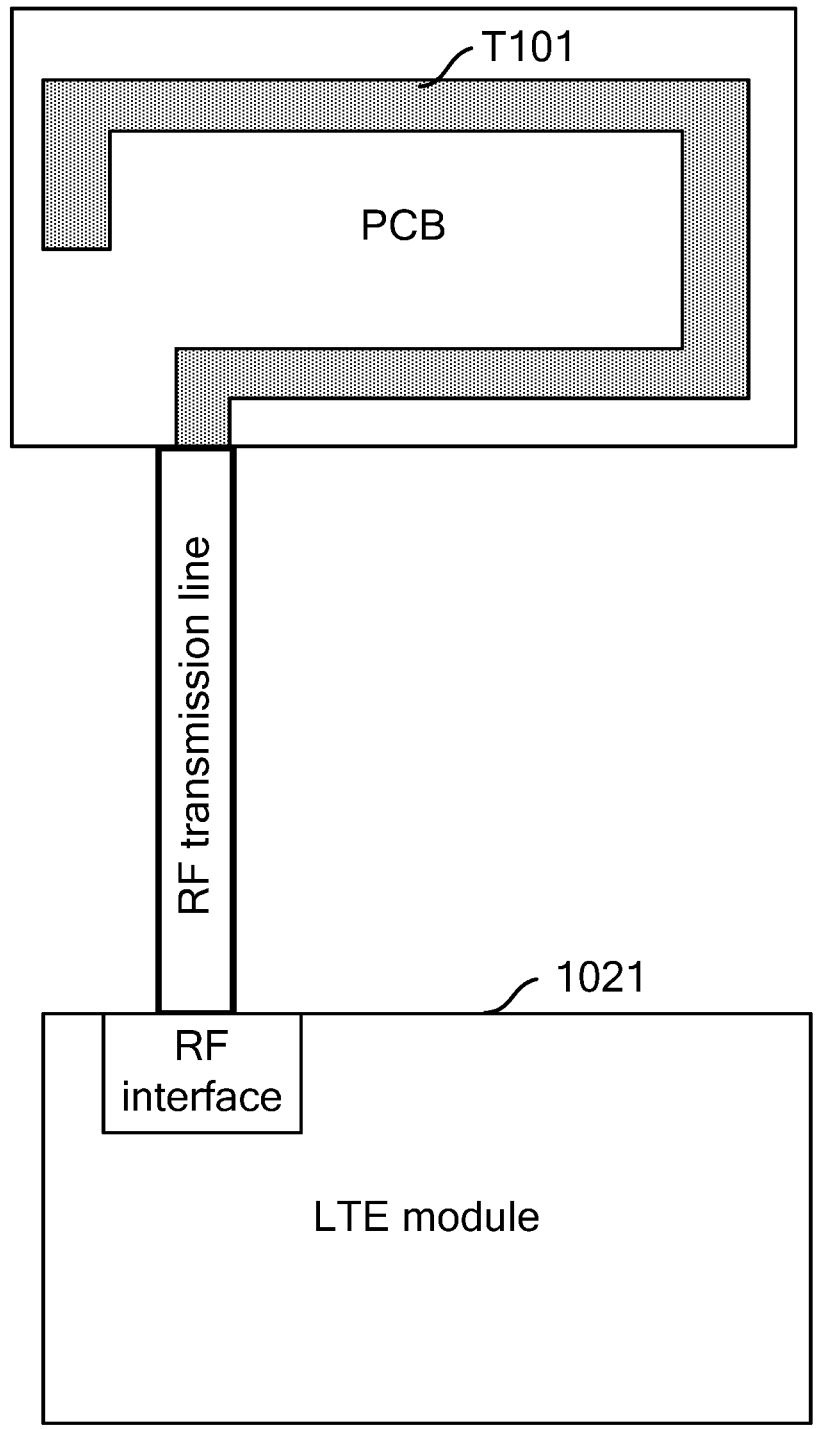
FIG. 13 is a schematic structural diagram of an antenna module according to an embodiment of the disclosure.

As illustrated in FIG. 13, the antenna module T101 is printed on a first Printed Circuit Board (PCB), where a metal layer of the first PCB is etched in an etching process to obtain the antenna module T101. Alternatively a pattern of the antenna module T101 can be printed on the first PCB. The antenna module T101 is connected with RF interface through Radio Frequency (RF) transmission line, where the RF interface is connected with the LTE module 1021. The LTE module 1021 transmits and receives signals through the antenna module T101. The antenna module T101 fabricated this way can be simplified in structural as a whole and convenient to install.

Second Scheme

Figure 14:
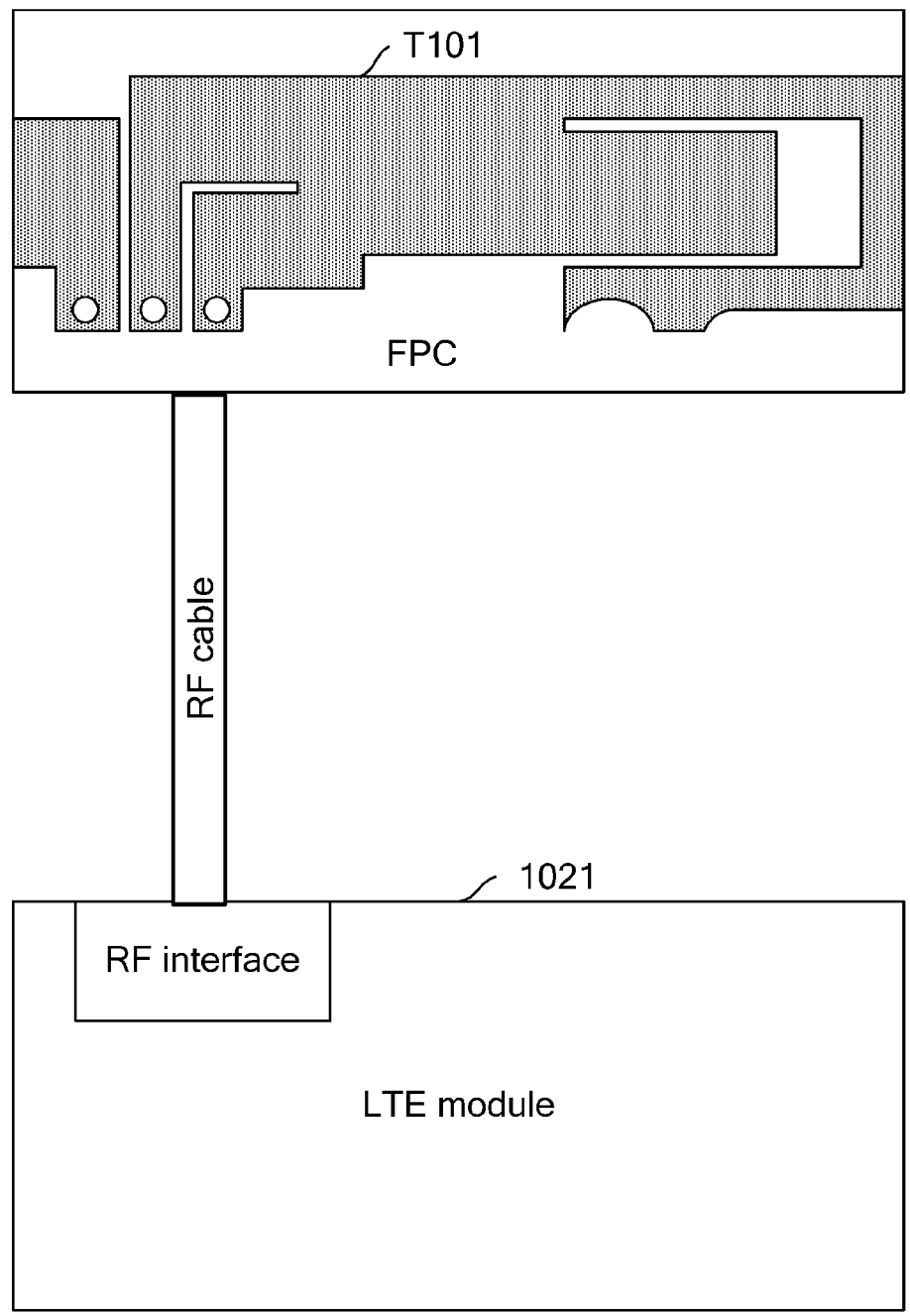
FIG. 14 is a schematic structural diagram of an antenna module according to an embodiment of the disclosure.

As illustrated in FIG. 14, the antenna module T101 is formed by etching a Flexible Printed Circuit (FPC). The FPC, which is covered by a mask with an antenna pattern, is exposed, and then a metal layer on the exposed FPC is etched, thus fabricating the antenna module T101 in the form of a labyrinth. The antenna module T101 fabricated in the FPC process is compact in structure and convenient to install, and the FPC can be affixed on the casing of the center console through a back-adhesive, e.g., on the outer casing of the center console, possibly on the outside or the inside of a non-metal part of the outer casing of the center console, or the FPC can be affixed on a second PCB. The antenna module T101 is connected to RF interface through RF cable, where the RF interface is connected with the LTE module 1021. The antenna module T101 fabricated this way has the advantage of a high wiring density, a low weight, high bendability, etc.

Third Scheme

Figure 15:
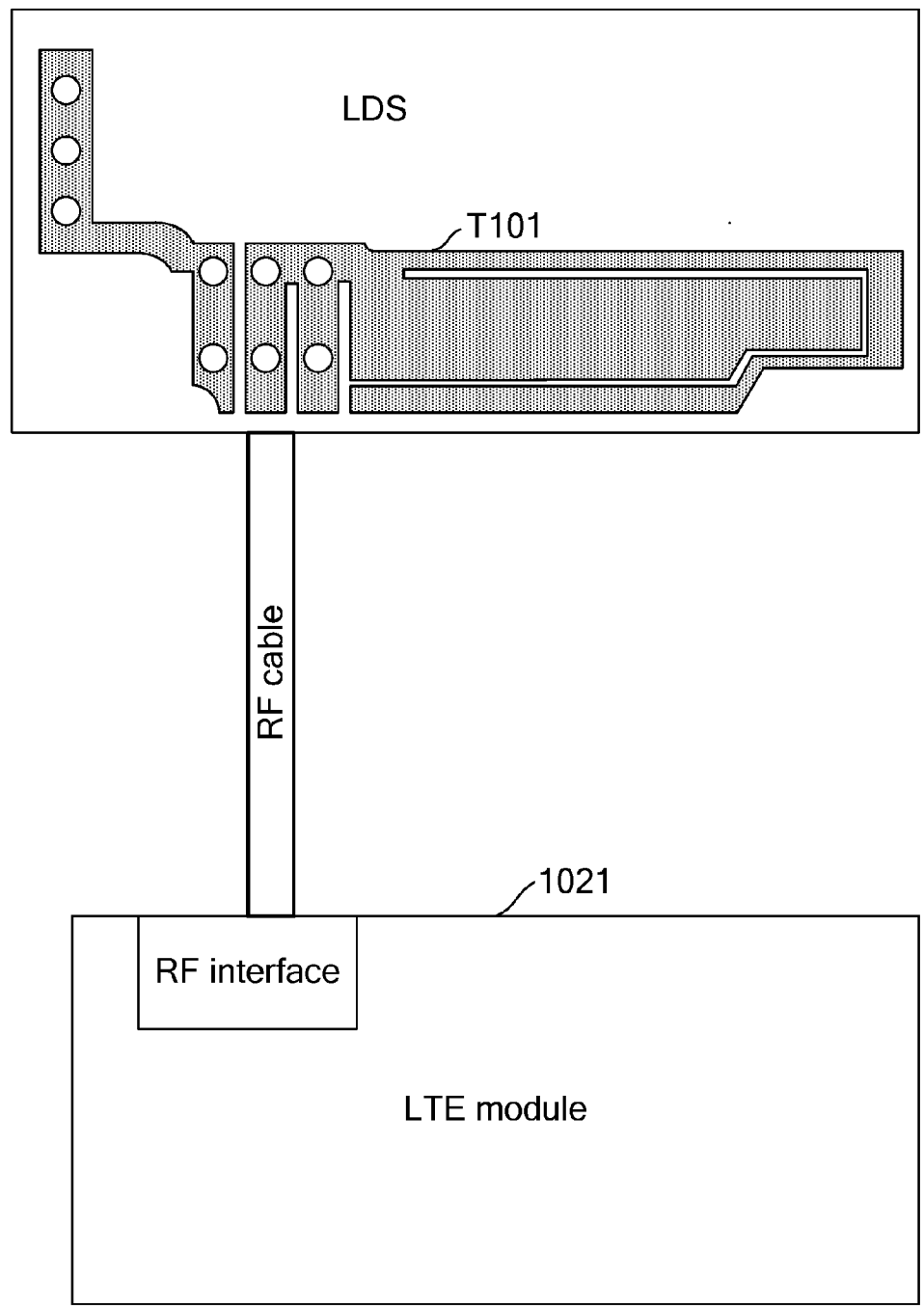
FIG. 15 is a schematic structural diagram of an antenna module according to an embodiment of the disclosure.

As illustrated in FIG. 15, the antenna module T101 is formed on the casing of a structure piece by laser carving with Laser Direct Structuring (LDS) process. Metal powers are laser carved onto the casing of any structure piece in an LDS process, e.g., on the outer casing of the center console, possibly on the outside or the inside of a non-metal part of the outer casing of the center console. The antenna module T101 fabricated this way can be designed with any antenna pattern and formed by laser carving on the casing of a structural piece in any shape flexibly without being restricted by the structural modality of a product, and can be prevented from being interfered by metal in the LTE module 1021, and also the volume of the LTE module 1021 can be lowered. The antenna module T101 is connected to RF interface through RF cable, where the RF interface is connected with the LTE module 1021.

Figure 16:
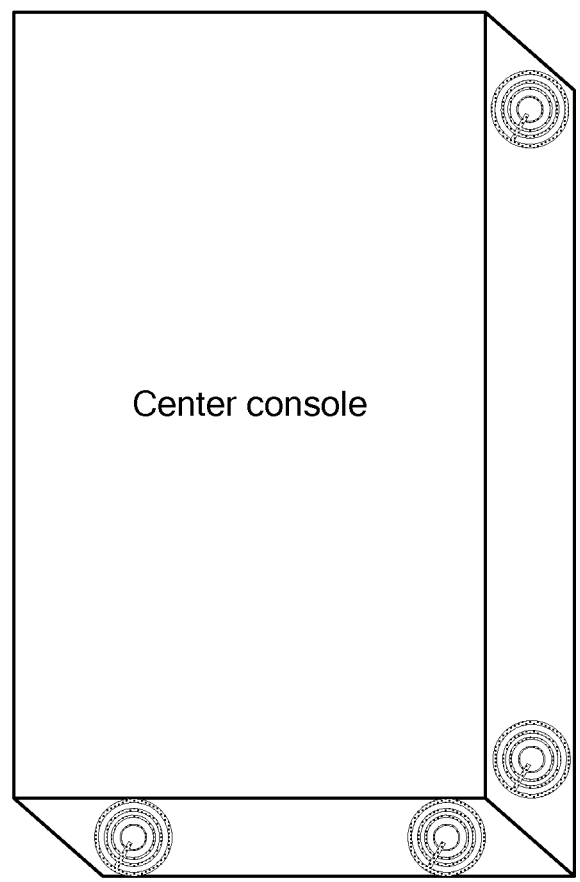
FIG. 16 is a schematic diagram of positioned antenna modules according to an embodiment of the disclosure.

In an embodiment of the disclosure, the antenna modules T101 can be arranged in the center console, and as illustrated in FIG. 16, the pattern of the antenna module T101 can be formed on the outer casing of the center console by laser carving with the LDS process, possibly on the outside or the inside of the outer casing of the center console. If the outer casing of the center console and a main screen of the center console are stacked and assembled together, then the antenna module T101 may be arranged on the four sides of the face of the separately installed outer casing facing passengers.

Figure 17:
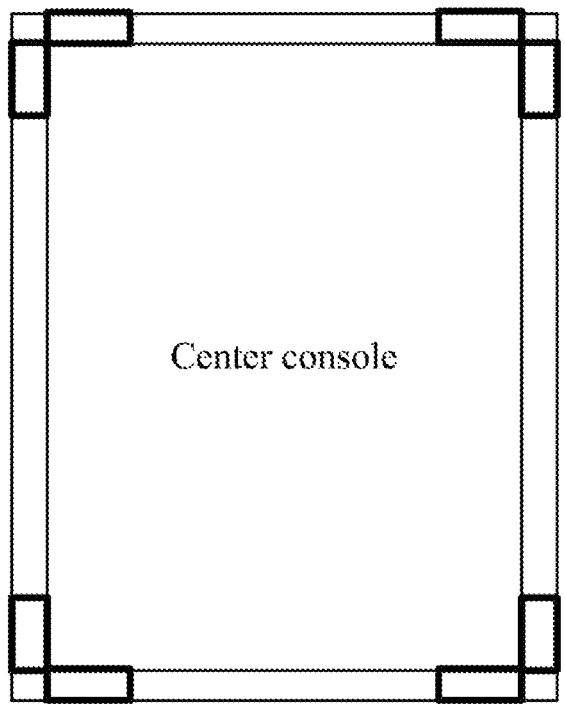
FIG. 17 is a schematic diagram of positioned antenna modules according to an embodiment of the disclosure.

Particularly FIG. 17 illustrates a schematic structural diagram of positioned antenna modules T101, where the antenna modules T101 can be positioned in the zones delimited by the bold solid lines in black in FIG. 17, that is, at the four corners on the four sides of the outer casing of the center console. There are four antenna modules T101 (including primary and secondary antennas) placed at the eight positions in total at the four corners, and there are the longest distances between the antenna modules T101 at the four corners. Although the distance between the primary and secondary antennas in the antenna module T101 at each of the corners is not the longest, the primary and secondary antennas can be positioned horizontal and vertical respectively to thereby facilitate isolation between the polarization directions so as to achieve good isolation between the two antennas, thus guaranteeing the performance of communication.

Figure 18:
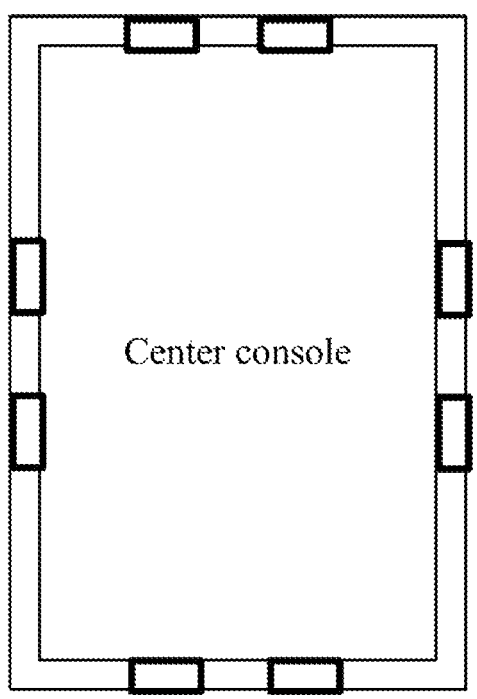
FIG. 18 is a schematic diagram of the position of antenna modules according to an embodiment of the disclosure.

FIG. 18 illustrates a schematic structural diagram of positioned antenna modules T101, where the antenna modules T101 can be positioned in the zones delimited by the bold solid lines in black in FIG. 18, that is, on the four sides of the outer casing of the center console, at the ⅓ lengths of the respective sides. There are four antenna modules T101 (including primary and secondary antennas) placed at the eight positions in total, so the distances between the respective antennas can make the antennas spaced the furthest to thereby guarantee the isolation between the respective antennas and thus the performance of communication.

Figure 19:
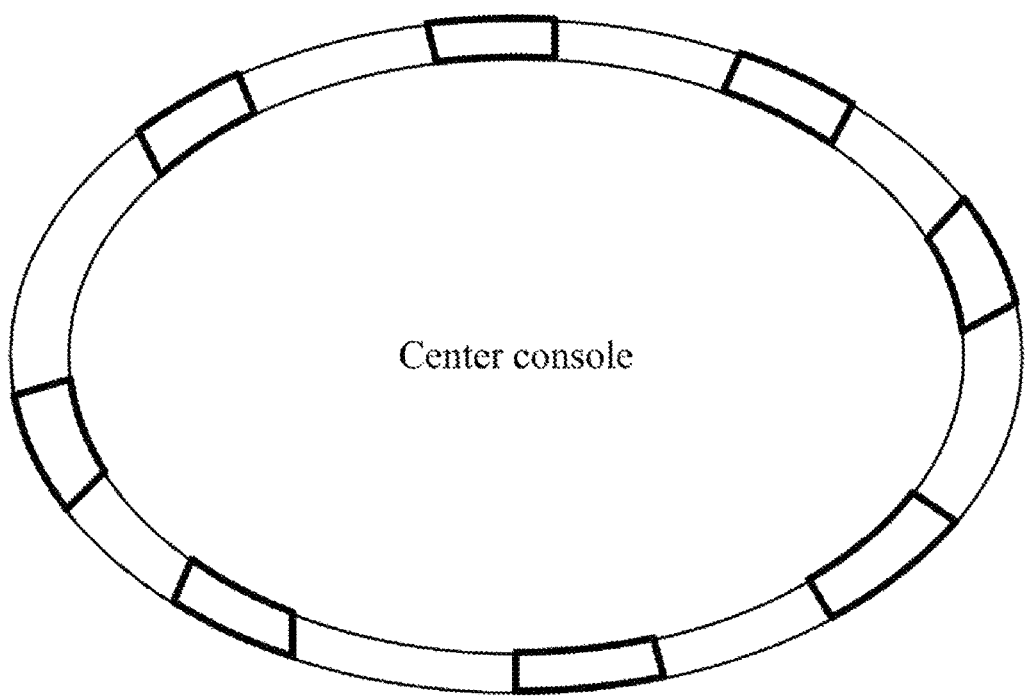
FIG. 19 is a schematic diagram of the position of antenna modules according to an embodiment of the disclosure.

FIG. 19 illustrates a schematic structural diagram of positioned antenna modules T101, where the antenna modules T101 can be positioned in the zones delimited by the bold solid lines in black in FIG. 19. The shape of the center console is an ellipse, and there are eight positions spaced equidistantly on the periphery of the outer casing of the center console, so there are four antenna modules T101 (including primary and secondary antennas) placed at these eight positions, so that the distances between the respective antennas can make the antennas spaced the furthest to thereby guarantee the isolation between the respective antennas and thus the performance of communication. If the shape of the center console is a circle, then they can be positioned alike.

Since antenna systems of vehicles in the prior art are designed with single antenna, the vehicles can receive various signals only if a plurality of antennas are installed on the vehicles, but these antennas have to be installed on the outsides of the roofs of the vehicles, thus increasing the instability of the vehicles. Unlike the prior art, the antenna modules T101 can be arranged on the center console of the vehicle according to the embodiment of the disclosure instead of being installed on the outside of the roof of the vehicle to thereby improving the stability of the vehicle.

The primary and secondary antennas in the antenna modules T101 above can be designed as directional antennas with a radiation angle of less than or equal to 180°. As compared with the antennas attached to the traditional vehicles, there will be higher gains of the directional antennas to thereby improve the efficiency of radiation. The radiation angles and directions of the respective antennas can be designed on purpose so that the radiation directions of the respective antennas can be designed to be oriented toward the windows of the vehicles or other zones thereof which are not shielded by metal, dependent upon the real position of the central control unit 102 in the body of the vehicle, and the positions of the antennas in the center console. As compared with omnidirectional antennas, there will be higher efficiency of signal transmission and a better communication effect of the directional antennas.

In an embodiment of the disclosure, the periphery of the casing of the center console can be embodied as four sides of a square casing or can be embodied as the periphery of a circular or elliptic casing. The casing of the center console in the embodiment of the disclosure will not be limited thereto.

As illustrated in FIG. 12, the central control unit T102 can be arranged on a second PCB, where the plurality of LTE modules 1021 and the CPU 1022 are arranged on the second PCB, and the plurality of LTE modules 1021 are connected with the CPU 1022 through wirings on the second PCB. The LTE modules can alternatively be arranged on a third PCB, where the LTE modules can be connected with the CPU 1022 in the central control unit T102 on the second PCB via Mini Peripheral Component Interconnect Express (PCIE) interfaces or other Peripheral Component Interconnect (PCI) interfaces.

The central control unit T102 includes N LTE modules 1021, all of which are connected respectively with the CPU 1022, where if there are a larger number of LTE modules 1021 connected with the CPU 1022, then there will be better performance, and possible high-speed communication, e.g., at 10 Gb/s, 20 Gb/s, etc., of the vehicular antenna system. Signals received by the LTE modules 1021 are transmitted to the CPU 1022 for processing.

In the embodiments of the disclosure, the antenna modules T101 and the central control unit T102 can be arranged in the center console, where the traveling traces between the antenna modules T101 and the central control unit 102 are designed so simple that there are less and shorter bundles of lines to thereby lower a loss of high-frequency power being transmitted so as to guarantee the superior performance.

Figure 20:
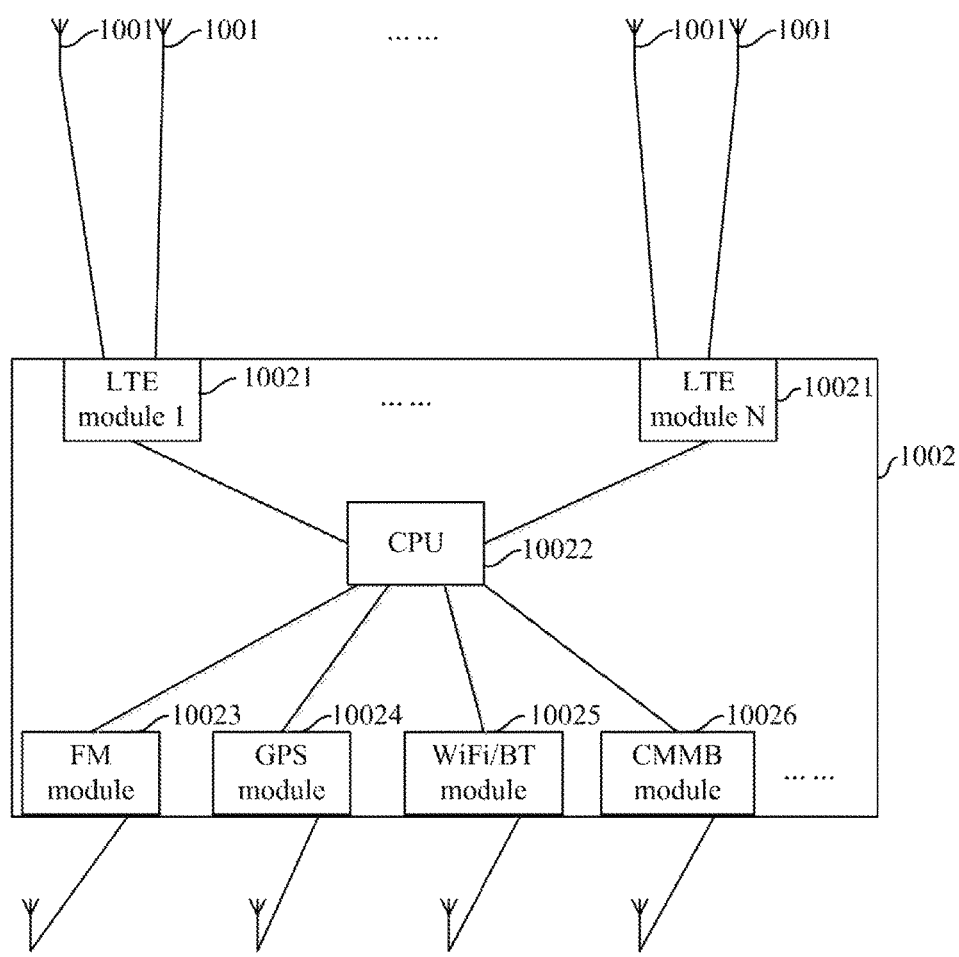
FIG. 20 is a schematic structural diagram of a vehicular antenna system according to an embodiment of the disclosure.

Correspondingly an embodiment of the disclosure further provides a vehicular antenna system, structured as illustrated in FIG. 20, which includes a central control unit 1002, and a plurality of antenna modules 1001, where the central control unit 1002 includes a CPU 10022 and a plurality of LTE modules 10021, each of the LTE modules 10021 in the central control unit 1002 is connected with at least one of the antenna modules 1001, and the plurality of LTE modules 10021 are connected respectively with the CPU 10022.

The central control unit 1002 includes the all units in FIG. 4A or includes all units in FIG. 4B, and transmits or receives information through the LTE modules T101 if necessary.

A CPU 10022, an FM module 10023, a GPS module 10024, a WiFi/BT module 10025, and a CMMB module 10026 are arranged on a second PCB of the central control unit 1002, and the vehicular antenna system further includes an FM antenna, a GPS antenna, a WiFi/BT antenna and a CMMB antenna corresponding to the FM module 10023, the GPS module 10024, the WiFi/BT module 10025, and the CMMB module 10026. The FM antenna, the GPS antenna, the WiFi/BT antenna and the CMMB antenna are connected sequentially with the central control unit 1002 through RF transmission lines.

Figure 21:
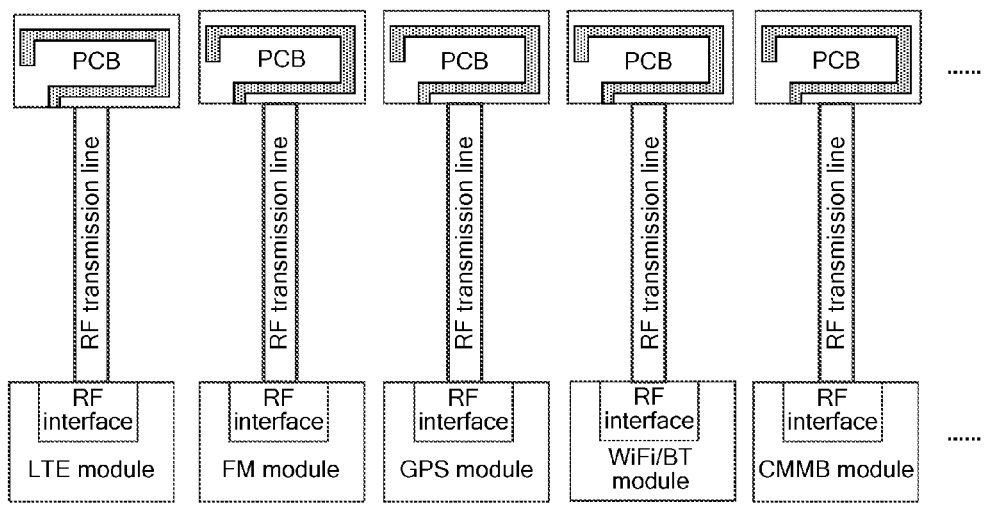
FIG. 21 is a schematic structural diagram of a vehicular antenna system according to an embodiment of the disclosure.
Figure 22:
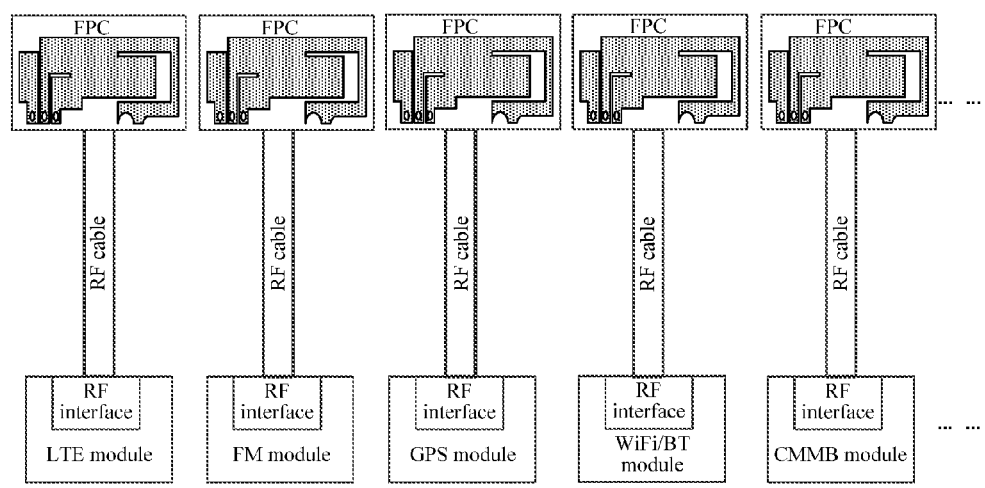
FIG. 22 is a schematic structural diagram of a vehicular antenna system according to an embodiment of the disclosure.
Figure 23:
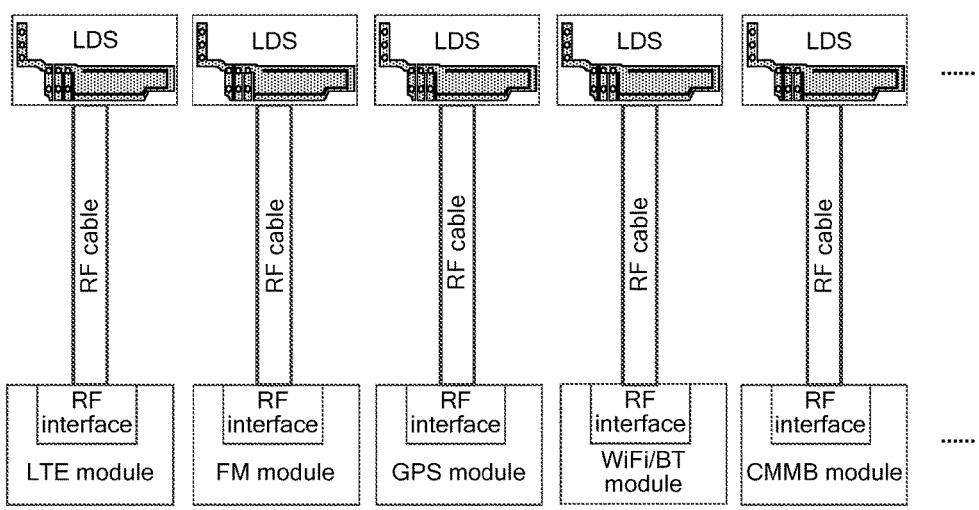
FIG. 23 is a schematic structural diagram of a vehicular antenna system according to an embodiment of the disclosure.

FIG. 21 to FIG. 23 illustrate structural diagrams of the vehicular antenna system including the antenna modules 1001 designed in the three processes respectively, where FIG. 21 illustrates a structural diagram of the vehicular antenna system including the antenna modules 1001 in the PCB process, FIG. 22 illustrates a structural diagram of the vehicular antenna system including the antenna modules 1001 in the FPC process, and FIG. 23 illustrates a structural diagram of the vehicular antenna system including the antenna modules 1001 in the LDS process. The particular structures of the vehicular antenna system in FIG. 21 to FIG. 23 have been described in the embodiments above, so a repeated description thereof will be omitted here.

Based upon the same inventive idea, an embodiment of the disclosure further provides a vehicle including the vehicular antenna system above, the particular structure of which has been described in the embodiments above, so a repeated description thereof will be omitted here.

In the vehicular antenna system according to the embodiments of the disclosure, the plurality of antenna modules can be connected with the plurality of LTE modules in the central control unit to thereby enable high-speed communication through the vehicular antennas, and the LTE modules can be arranged in the central control unit to thereby shorten the length of a bundle of lines so as to lower the attenuation of a signal, to improve the efficiency of transmission, and to lower the power consumption.

The embodiments of the devices described above are merely exemplary, where the units described as separate components may or may not be physically separate, and the components illustrated as elements may or may not be physical units, that is, they can be collocated or can be distributed onto a number of network elements. A part or all of the modules can be selected as needed in reality for the purpose of the solution according to the embodiments of the disclosure. This can be understood and practiced by those ordinarily skilled in the art without any inventive effort.

Those skilled in the art can clearly appreciate from the foregoing description of the embodiments that the embodiments of the disclosure can be implemented in hardware or in software plus a necessary general hardware platform. Based upon such understanding, the technical solutions above essentially or their parts contributing to the prior art can be embodied in the form of a computer software product which can be stored in a computer readable storage medium, e.g., an ROM/RAM, a magnetic disk, an optical disk, etc., and which includes several instructions to cause a computer device (e.g., a personal computer, a server, a network device, etc.) to perform the method according to the respective embodiments of the disclosure.

Lastly it shall be noted that the embodiments above are merely intended to illustrate but not to limit the technical solution of the disclosure; and although the disclosure has been described above in details with reference to the embodiments above, those ordinarily skilled in the art shall appreciate that they can modify the technical solution recited in the respective embodiments above or make equivalent substitutions to a part of the technical features thereof; and these modifications or substitutions to the corresponding technical solution shall also fall into the scope of the disclosure as claimed.

The invention claimed is:

1. A method for data transfer over a plurality of links, the method comprising:

selecting, by a transmitting device, at least one virtual link over which a data packet needs to be transmitted, from a plurality of virtual links;

determining, by the transmitting device, a physical link corresponding to the selected virtual link according to a binding relationship between the virtual link and the physical link; and transmitting, by the transmitting device, the data packet to a receiving device over the determined physical link;

wherein the data packet comprises an Internet Protocol (IP) address corresponding to the virtual link, and the plurality of virtual links correspond to the same IP address; and if handshake authentication needs to be performed on the receiving device, then performing, by the transmitting device, the handshake authentication on the receiving device, and notifying the receiving device after the handshake authentication is successful and it is determined that a virtual link can be set up for a physical link corresponding to an IP address notified by the receiving device; and receiving, by the transmitting device, an updated binding relationship between the virtual link and the physical link, from the receiving device.

2. The method according to claim 1, wherein the binding relationship between the virtual link and the physical link is a binding relationship between an identifier of the virtual link and the IP address of the physical link.

3. The method according to claim 1, wherein before the transmitting device selects the virtual link over which the data needs to be transmitted, from the plurality of virtual links, the method further comprises:

determining, by the transmitting device, an IP address which is notified to the receiving device during handshake authentication, and setting up a virtual link for a physical link corresponding to the determined IP address, after the handshake authentication between the transmitting device and the receiving device is successful; and updating, by the transmitting device, a binding relationship between the virtual link and the physical link, and transmitting the updated binding relationship between the virtual link and the physical link to the receiving device.

4. The method according to claim 1, wherein the method further comprises:
upon detecting that a virtual link is saturated, transmitting, by the transmitting device, a data packet corresponding to the saturated virtual link over a physical link corresponding to another virtual link, and after the saturated virtual link is resumed, transmitting the data packet corresponding to the resumed virtual link over a physical link corresponding to the resumed virtual link.

5. The method according to claim 1, wherein the method further comprises:
updating, by the transmitting device, a binding relationship between the virtual link and a physical link after the receiving device notifies a released virtual link.

6. The method according to claim 1, wherein selecting, by the transmitting device, the virtual link over which the data packet needs to be transmitted, from the plurality of virtual links comprises:
selecting, by the transmitting device, the virtual link over which the data packet needs to be transmitted, from the plurality of virtual links according to link quality values corresponding to the virtual links, link quality values being determined according to link parameters of the physical links corresponding to the virtual links.

7. The method according to claim 1, wherein if the transmitting device is a terminal, then the receiving device is a Virtual Private Network (VPN) server; and
if the transmitting device is a VPN server, then the receiving device is a terminal.

8. A device for data transfer over a plurality of links, the device comprising:
one or more processors; and
a memory;
wherein the memory has computer readable program codes stored therein, and the one or more processors are configured to execute the computer readable program codes to perform:
selecting at least one virtual link over which a data packet needs to be transmitted, from a plurality of virtual links;
determining a physical link corresponding to the selected virtual link according to a binding relationship between the virtual link and the physical link; and
transmitting the data packet to a receiving device over the determined physical link;
wherein the data packet comprises an Internet Protocol (IP) address corresponding to the virtual link, and the plurality of virtual links correspond to the same IP address; and
if handshake authentication needs to be performed on the receiving device, then performing the handshake authentication on the receiving device, and notifying the receiving device after the handshake authentication is successful and it is determined that a virtual link can be set up for a physical link corresponding to an IP address notified by the receiving device; and
receiving an updated binding relationship between the virtual link and the physical link, from the receiving device.

9. The device according to claim 8, wherein the binding relationship between the virtual link and the physical link is a binding relationship between an identifier of the virtual link and the IP address of the physical link.

10. The device according to claim 8, wherein before the selecting the virtual link over which the data needs to be transmitted, from the plurality of virtual links, the one or more processors are further configured to perform:
determining an IP address which is notified to the receiving device during handshake authentication, and setting up a virtual link for a physical link corresponding to the determined IP address, after the handshake authentication between the device for data transfer and the receiving device is successful; and
updating a binding relationship between the virtual link and the physical link, and transmitting the updated binding relationship between the virtual link and the physical link to the receiving device.

11. The device according to claim 8, wherein the one or more processors are further configured to perform:
upon detecting that a virtual link is saturated, transmitting a data packet corresponding to the saturated virtual link over a physical link corresponding to another virtual link, and after the saturated virtual link is resumed, transmitting the data packet corresponding to the resumed virtual link over a physical link corresponding to the resumed virtual link.

12. The device according to claim 8, wherein the one or more processors are further configured to perform:
updating a binding relationship between the virtual link and a physical link after the receiving device notifies a released virtual link.

13. The device according to claim 8, wherein selecting the virtual link over which the data packet needs to be transmitted, from the plurality of virtual links comprises:
selecting the virtual link over which the data packet needs to be transmitted, from the plurality of virtual links according to link quality values corresponding to the virtual links, link quality values being determined according to link parameters of the physical links corresponding to the virtual links.

* * * * *